US009648542B2

(12) United States Patent
Hsu et al.

(10) Patent No.: US 9,648,542 B2
(45) Date of Patent: May 9, 2017

(54) SESSION-BASED PACKET ROUTING FOR FACILITATING ANALYTICS

(71) Applicant: Brocade Communications Systems, Inc., San Jose, CA (US)

(72) Inventors: Ivy Pei-Shan Hsu, Dublin, CA (US); Sanjeev Nand Chhabria, Castro Valley, CA (US); Xiaochu Chen, San Ramon, CA (US); Sanjay Munshi, San Ramon, CA (US); Arvindsrinivasan Lakshmi Narasimhan, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 106 days.

(21) Appl. No.: 14/603,304

(22) Filed: Jan. 22, 2015

(65) Prior Publication Data

US 2015/0215841 A1 Jul. 30, 2015

Related U.S. Application Data

(60) Provisional application No. 61/932,650, filed on Jan. 28, 2014, provisional application No. 61/994,693, (Continued)

(51) Int. Cl.
*H04W 40/02* (2009.01)
*H04L 12/26* (2006.01)
(Continued)

(52) U.S. Cl.
CPC ............ *H04W 40/02* (2013.01); *H04L 43/12* (2013.01); *H04L 63/1408* (2013.01); (Continued)

(58) Field of Classification Search
None
See application file for complete search history.

(56) References Cited

U.S. PATENT DOCUMENTS 5,031,094 A 7/1991 Toegel et al.
5,359,593 A 10/1994 Derby et al.
(Continued)

FOREIGN PATENT DOCUMENTS

EP 2654340 A1 10/2013
IE 20070438 A1 2/2008
(Continued)

OTHER PUBLICATIONS

Notice of Allowance for U.S. Appl. No. 13/584,534 mailed on Jan. 6, 2016, 4 pages.
(Continued)

*Primary Examiner* — Hong Cho
(74) *Attorney, Agent, or Firm* — Fountainhead Law Group P.C.

(57) ABSTRACT

A GTP correlation cluster (GCC) can automatically program a network element to forward copies of packets originating from a mobile device and having a shared attribute to the same analytic server, regardless of the regions into which the mobile device moves. The GCC can monitor attributes of copies of control packets that the network element receives. In response to detecting a changed attribute within a control packet originating from a mobile device, the GCC can update a session map specific to that mobile device in order to cause packets having that changed attribute to be forwarded to the same port to which packets having the former attribute were being forwarded prior to the change. As a result, the network element can ensure that packets belong-
(Continued)

ing to a particular session still are forwarded to the same analytic server even if the mobile device has moved to a different region.

16 Claims, 10 Drawing Sheets

Related U.S. Application Data filed on May 16, 2014, provisional application No. 62/088,434, filed on Dec. 5, 2014.

(51) Int. Cl.
*H04L 29/06* (2006.01)
*H04W 12/12* (2009.01)

(52) U.S. Cl.
CPC ........... *H04W 12/12* (2013.01); *H04L 43/026* (2013.01); *H04L 63/101* (2013.01)

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sistanizadeh et al. |
| 6,681,323 B1 | 1/2004 | Fontanesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,086 B2 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,177,943 B1 | 2/2007 | Temoshenko et al. |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood Smith |
| 7,454,500 B1 | 11/2008 | Hsu et al. |
| 7,483,374 B2 | 1/2009 | Nilakantan et al. |
| 7,492,713 B1 * | 2/2009 | Turner ............... H04L 12/4633 370/231 |
| 7,506,065 B2 | 3/2009 | LaVigne et al. |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |

(56) References Cited

U.S. PATENT DOCUMENTS

| | | | |
|---|---|---|---|
| 7,706,363 B1 | 4/2010 | Daniel et al. | |
| 7,716,370 B1 | 5/2010 | Devarapalli | |
| 7,720,066 B2 | 5/2010 | Weyman et al. | |
| 7,720,076 B2 | 5/2010 | Dobbins et al. | |
| 7,747,737 B1 | 6/2010 | Apte et al. | |
| 7,756,965 B2 | 7/2010 | Joshi | |
| 7,774,833 B1 | 8/2010 | Szeto et al. | |
| 7,787,454 B1 | 8/2010 | Won et al. | |
| 7,792,047 B2 | 9/2010 | Gallatin et al. | |
| 7,835,348 B2 * | 11/2010 | Kasralikar | H04L 63/1408 370/360 |
| 7,835,358 B2 | 11/2010 | Gallatin et al. | |
| 7,840,678 B2 | 11/2010 | Joshi | |
| 7,848,326 B1 | 12/2010 | Leong et al. | |
| 7,889,748 B1 | 2/2011 | Leong et al. | |
| 7,899,899 B2 | 3/2011 | Joshi | |
| 7,940,766 B2 | 5/2011 | Olakangil et al. | |
| 7,953,089 B1 | 5/2011 | Ramakrishnan et al. | |
| 8,208,494 B2 | 6/2012 | Leong | |
| 8,238,344 B1 | 8/2012 | Chen et al. | |
| 8,239,960 B2 | 8/2012 | Frattura et al. | |
| 8,248,928 B1 | 8/2012 | Wang et al. | |
| 8,270,845 B2 | 9/2012 | Cheung et al. | |
| 8,315,256 B2 | 11/2012 | Leong et al. | |
| 8,386,846 B2 | 2/2013 | Cheung | |
| 8,391,286 B2 | 3/2013 | Gallatin et al. | |
| 8,504,721 B2 | 8/2013 | Hsu et al. | |
| 8,514,718 B2 | 8/2013 | Zijst | |
| 8,537,697 B2 | 9/2013 | Leong et al. | |
| 8,570,862 B1 | 10/2013 | Leong et al. | |
| 8,615,008 B2 | 12/2013 | Natarajan et al. | |
| 8,654,651 B2 | 2/2014 | Leong et al. | |
| 8,824,466 B2 | 9/2014 | Won et al. | |
| 8,830,819 B2 | 9/2014 | Leong et al. | |
| 8,873,557 B2 | 10/2014 | Nguyen | |
| 8,891,527 B2 | 11/2014 | Wang | |
| 8,897,138 B2 | 11/2014 | Yu et al. | |
| 8,953,458 B2 | 2/2015 | Leong et al. | |
| 9,155,075 B2 * | 10/2015 | Song | H04W 72/04 |
| 9,264,446 B2 * | 2/2016 | Goldfarb | H04L 43/026 |
| 9,270,566 B2 | 2/2016 | Wang et al. | |
| 9,294,367 B2 | 3/2016 | Natarajan et al. | |
| 9,380,002 B2 * | 6/2016 | Johansson | H04L 49/25 |
| 9,479,415 B2 | 10/2016 | Natarajan et al. | |
| 9,565,138 B2 | 2/2017 | Chen et al. | |
| 2001/0049741 A1 | 12/2001 | Skene et al. | |
| 2001/0052016 A1 | 12/2001 | Skene et al. | |
| 2002/0018796 A1 | 2/2002 | Wironen | |
| 2002/0023089 A1 | 2/2002 | Woo | |
| 2002/0026551 A1 | 2/2002 | Kamimaki et al. | |
| 2002/0038360 A1 | 3/2002 | Andrews et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | |
| 2002/0078233 A1 | 6/2002 | Biliris et al. | |
| 2002/0091840 A1 | 7/2002 | Pulier et al. | |
| 2002/0112036 A1 | 8/2002 | Bohannon et al. | |
| 2002/0120743 A1 | 8/2002 | Shabtay et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0188862 A1 | 12/2002 | Trethewey et al. | |
| 2002/0194324 A1 | 12/2002 | Guha | |
| 2002/0194335 A1 | 12/2002 | Maynard | |
| 2003/0023744 A1 * | 1/2003 | Sadot | H04L 67/1008 709/234 |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | |
| 2003/0065763 A1 | 4/2003 | Swildens et al. | |
| 2003/0105797 A1 | 6/2003 | Dolev et al. | |
| 2003/0115283 A1 | 6/2003 | Barbir et al. | |
| 2003/0135509 A1 | 7/2003 | Davis et al. | |
| 2003/0202511 A1 | 10/2003 | Sreejith et al. | |
| 2003/0210686 A1 | 11/2003 | Terrell et al. | |
| 2003/0210694 A1 | 11/2003 | Jayaraman et al. | |
| 2003/0229697 A1 | 12/2003 | Borella | |
| 2004/0019680 A1 | 1/2004 | Chao et al. | |
| 2004/0024872 A1 | 2/2004 | Kelley et al. | |
| 2004/0032868 A1 | 2/2004 | Oda et al. | |
| 2004/0064577 A1 | 4/2004 | Dahlin et al. | |
| 2004/0194102 A1 | 9/2004 | Neerdaels | |
| 2004/0243718 A1 * | 12/2004 | Fujiyoshi | H04L 45/06 709/237 |
| 2004/0249939 A1 | 12/2004 | Amini et al. | |
| 2004/0249971 A1 | 12/2004 | Klinker | |
| 2005/0021883 A1 | 1/2005 | Shishizuka et al. | |
| 2005/0033858 A1 | 2/2005 | Swildens et al. | |
| 2005/0060418 A1 | 3/2005 | Sorokopud | |
| 2005/0060427 A1 | 3/2005 | Phillips et al. | |
| 2005/0086295 A1 | 4/2005 | Cunningham et al. | |
| 2005/0149531 A1 | 7/2005 | Srivastava | |
| 2005/0169180 A1 | 8/2005 | Ludwig | |
| 2005/0190695 A1 | 9/2005 | Phaal | |
| 2005/0207417 A1 | 9/2005 | Ogawa et al. | |
| 2005/0278565 A1 | 12/2005 | Frattura et al. | |
| 2005/0286416 A1 | 12/2005 | Shimonishi et al. | |
| 2006/0036743 A1 | 2/2006 | Deng et al. | |
| 2006/0039374 A1 | 2/2006 | Belz et al. | |
| 2006/0045082 A1 | 3/2006 | Fertell et al. | |
| 2006/0143300 A1 | 6/2006 | See et al. | |
| 2007/0044141 A1 | 2/2007 | Lor et al. | |
| 2007/0053296 A1 | 3/2007 | Yazaki et al. | |
| 2007/0171918 A1 | 7/2007 | Ota et al. | |
| 2007/0195761 A1 | 8/2007 | Tatar et al. | |
| 2007/0233891 A1 | 10/2007 | Luby et al. | |
| 2008/0002591 A1 | 1/2008 | Ueno | |
| 2008/0028077 A1 | 1/2008 | Kamata et al. | |
| 2008/0031141 A1 | 2/2008 | Lean et al. | |
| 2008/0089336 A1 | 4/2008 | Mercier et al. | |
| 2008/0137660 A1 | 6/2008 | Olakangil et al. | |
| 2008/0159141 A1 | 7/2008 | Soukup et al. | |
| 2008/0181119 A1 | 7/2008 | Beyers | |
| 2008/0195731 A1 | 8/2008 | Harmel et al. | |
| 2008/0225710 A1 | 9/2008 | Raja et al. | |
| 2008/0304423 A1 | 12/2008 | Chuang et al. | |
| 2009/0135835 A1 | 5/2009 | Gallatin et al. | |
| 2009/0262745 A1 | 10/2009 | Leong et al. | |
| 2010/0011126 A1 | 1/2010 | Hsu et al. | |
| 2010/0135323 A1 | 6/2010 | Leong | |
| 2010/0209047 A1 | 8/2010 | Cheung et al. | |
| 2010/0228974 A1 | 9/2010 | Watts et al. | |
| 2010/0293296 A1 | 11/2010 | Hsu et al. | |
| 2010/0325178 A1 | 12/2010 | Won et al. | |
| 2011/0044349 A1 | 2/2011 | Gallatin et al. | |
| 2011/0058566 A1 | 3/2011 | Leong et al. | |
| 2011/0211443 A1 | 9/2011 | Leong et al. | |
| 2011/0216771 A1 | 9/2011 | Gallatin et al. | |
| 2012/0023340 A1 | 1/2012 | Cheung | |
| 2012/0103518 A1 | 5/2012 | Kakimoto et al. | |
| 2012/0157088 A1 | 6/2012 | Gerber et al. | |
| 2012/0201137 A1 | 8/2012 | Le Faucheur et al. | |
| 2012/0243533 A1 | 9/2012 | Leong | |
| 2012/0257635 A1 | 10/2012 | Gallatin et al. | |
| 2013/0010613 A1 | 1/2013 | Cafarelli et al. | |
| 2013/0028072 A1 | 1/2013 | Addanki | |
| 2013/0034107 A1 | 2/2013 | Leong et al. | |
| 2013/0156029 A1 | 6/2013 | Gallatin et al. | |
| 2013/0173784 A1 | 7/2013 | Wang et al. | |
| 2013/0201984 A1 | 8/2013 | Wang | |
| 2013/0259037 A1 | 10/2013 | Natarajan et al. | |
| 2013/0272135 A1 | 10/2013 | Leong | |
| 2014/0016500 A1 | 1/2014 | Leong et al. | |
| 2014/0022916 A1 | 1/2014 | Natarajan et al. | |
| 2014/0029451 A1 | 1/2014 | Nguyen | |
| 2014/0040478 A1 | 2/2014 | Hsu et al. | |
| 2014/0204747 A1 | 7/2014 | Yu et al. | |
| 2014/0233399 A1 | 8/2014 | Mann et al. | |
| 2014/0321278 A1 | 10/2014 | Cafarelli et al. | |
| 2015/0009828 A1 | 1/2015 | Murakami | |
| 2015/0033169 A1 | 1/2015 | Lection et al. | |
| 2015/0071171 A1 | 3/2015 | Akiyoshi | |

(56) References Cited

U.S. PATENT DOCUMENTS

| | | | |
|---|---|---|---|
| 2015/0103824 A1 | 4/2015 | Tanabe | |
| 2015/0170920 A1 | 6/2015 | Purayath et al. | |
| 2015/0180802 A1 | 6/2015 | Chen et al. | |
| 2015/0207905 A1 | 7/2015 | Merchant et al. | |
| 2015/0281125 A1 | 10/2015 | Koponen et al. | |
| 2016/0149811 A1 | 5/2016 | Roch et al. | |
| 2016/0164768 A1 | 6/2016 | Natarajan et al. | |
| 2016/0204996 A1* | 7/2016 | Lindgren | H04L 43/022 709/224 |
| 2016/0285735 A1 | 9/2016 | Chen et al. | |
| 2016/0285762 A1 | 9/2016 | Chen et al. | |
| 2016/0285763 A1 | 9/2016 | Laxman et al. | |
| 2016/0373303 A1 | 12/2016 | Vedam et al. | |
| 2016/0373304 A1 | 12/2016 | Sharma et al. | |
| 2016/0373304 A1 | 12/2016 | Sharma et al. | |
| 2016/0373351 A1 | 12/2016 | Sharma et al. | |
| 2016/0373352 A1 | 12/2016 | Sharma et al. | |

FOREIGN PATENT DOCUMENTS

| | | |
|---|---|---|
| WO | 2010135474 A1 | 11/2010 |
| WO | 2015116538 A1 | 8/2015 |

OTHER PUBLICATIONS

U.S. Appl. No. 12/272,618, Final Office Action mailed on May 5, 2014, 13 pages.
U.S. Appl. No. 12/272,618, NonFinal Office Action mailed on Jul. 29, 2013, 13 pages.
U.S. Appl. No. 12/272,618, NonFinal Office Action mailed on Jan. 12, 2015, 5 pages.
U.S. Appl. No. 12/272,618, Notice of Allowance mailed on Aug. 26, 2015, 11 pages.
U.S. Appl. No. 12/272,618, Final Office Action mailed on Feb. 28, 2012, 12 pages.
U.S. Appl. No. 13/925,670, NonFinal Office Action mailed on Nov. 16, 2015, 48 pages.
U.S. Appl. No. 14/230,590, Notice of Allowance mailed on Sep. 23, 2015, 8 pages.
U.S. Appl. No. 15/043,421, Notice of Allowance mailed on Jun. 27, 2016, 21 pages.
U.S. Appl. No. 14/848,586, filed Sep. 9, 2015 by Chen et al.
U.S. Appl. No. 14/848,645, filed Sep. 9, 2015 by Chen et al.
U.S. Appl. No. 14/848,677, filed Sep. 9, 2015 by Laxman et al.
Non-Final Office Action for U.S. Appl. No. 14/320,138 mailed on Feb. 2, 2016, 30 pages.
U.S. Appl. No. 14/927,478, filed Oct. 30, 2015 by Vedam et al.
U.S. Appl. No. 14/927,479, filed Oct. 30, 2015 by Sharma et al.
U.S. Appl. No. 14/927,482, filed Oct. 30, 2015 by Sharma et al.
U.S. Appl. No. 14/927,484, filed Oct. 30, 2015 by Sharma et al.
nGenius Subscriber Intelligence, http://www.netscout.com/uploads/2015/03NetScout_DS_Subscriber_Intelligence_SP.pdf, downloaded circa Mar. 23, 2015, pp. 1-6.
Xu et al.: Cellular Data Network Infrastructure Characterization and Implication on Mobile Content Placement, Sigmetrics '11 Proceedings of the ACM SIGMETRICS joint international conference on Measurement and modeling of computer systems, date Jun. 7-11, 2011, pp. 1-12, ISBN: 978-1-4503-0814-4 ACM New York, NY, USA copyright 2011.
E.H.T.B. Brands, Flow-Based Monitoring of GTP Trac in Cellular Networks, Date: Jul. 20, 2012, pp. 1-64, University of Twente, Enschede, The Netherlands.
Dosmos DeepFlow: Subscriber Analytics Use Case, http://www.qosmos.com/wp-content/uploads/2014/01/Qosmos-DeepFlow-Analytics-use-case-datasheet-Jan-2014.pdf, date Jan. 2014, pp. 1-2.
Configuring GTM to determine packet gateway health and availability, https://support.f5.com/kb/en-us/products/big-ip_gtm/manuals/product/gtm-implementations-11-6-0/9.html, downloaded circa Mar. 23, 2015, pp. 1-5.

ExtraHop-Arista Persistent Monitoring Architecture for SDN, downloaded circa Apr. 2, 2015, pp. 1-5.
7433 GTP Session Controller, www.ixia.com, downloaded circa Apr. 2, 2015, pp. 1-3.
Stateful GTP Correlation, https://www.gigamon.com/PDF/appnote/AN-GTP-Correlation-Stateful-Subscriber-Aware-Filtering-4025.pdf, date 2013, pp. 1-9.
GigaVUE-2404 // Data Sheet, www.gigamon.com, date Feb. 2014, pp. 1-6.
nGenius Performance Manager, www.netscout.com, date Mar. 2014, pp. 1-8.
GigaVUE-VM // Data Sheet, www.gigamon.com, date Oct. 2014, pp. 1-3.
Unified Visibility Fabric an Innovative Approach, https://www.gigamon.com/unified-visibility-fabric, Downloaded circa Mar. 30, 2015, pp. 1-4.
adaptiv.io and Apsalar Form Strategic Partnership to Provide Omnichannel Mobile Data Intelligence, http://www.businesswire.com/news/home/20150113005721/en/adaptiv.io-Apsalar-Form-Strategic-Partnership-Provide-Omni-channel, Downloaded circa Mar. 30, 2015, pp. 1-2.
Real-time Data Analytics with IBM InfoSphere Streams and Brocade MLXe Series Devices, www.brocade.com, date 2011, pp. 1-2.
Syniverse Proactive Roaming Data Analysis—VisProactive, http://m.syniverse.com/files/service_solutions/pdf/solutionsheet_visproactive_314.pdf, date 2014, pp. 1-3.
Network Analytics: Product Overview, www.sandvine.com, date Apr. 28, 2014, pp. 1-2.
Non-Final Office Action for U.S. Appl. No. 15/043,421 mailed on Apr. 13, 2016, 18 pages.
Notice of Allowance for U.S. Appl. No. 14/030,782 mailed on Nov. 16, 2015, 20 pages.
Non-Final Office Action for U.S. Appl. No. 11/937,285 mailed on Aug. 17, 2010, 28 pages.
Final Office Action for U.S. Appl. No. 11/937,285 mailed on Jan. 20, 2011, 41 pages.
Final Office Action for U.S. Appl. No. 11/937,285 mailed on May 20, 2011, 37 pages.
Non-Final Office Action for U.S. Appl. No. 11/937,285 mailed on Nov. 28, 2011, 40 pages.
Notice of Allowance for U.S. Appl. No. 11/937,285 mailed on Jun. 5, 2012, 10 pages.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
PCT Patent Application No. PCT/US2015/012915 filed on Jan. 26, 2015 by Hsu et al.
U.S. Appl. No. 14/320,138, filed Jun. 30, 2014 by Chen et al.
Non-Final Office Action for U.S. Appl. No. 11/827,524 mailed on Dec. 10, 2009, 15 pages.
Non-Final Office Action for U.S. Appl. No. 11/827,524 mailed on Jun. 2, 2010, 14 pages.
Non-Final Office Action for U.S. Appl. No. 11/827,524 mailed on Nov. 26, 2010, 16 pages.
Final Office Action U.S. Appl. No. 11/827,524 mailed on May 6, 2011, 19 pages.
Advisory Action for U.S. Appl. No. 11/827,524 mailed on Jul. 14, 2011, 5 pages.
Non-Final Office Action for U.S. Appl. No. 11/827,524 mailed on Oct. 18, 2012, 24 pages.
Notice of Allowance for U.S. Appl. No. 11/827,524 mailed Jun. 25, 2013, 11 pages.
Non-Final Office Action for U.S. Appl. No. 14/030,782 mailed on Oct. 6, 2014, 14 pages.
IBM User Guide, Version 2.1AIX, Solaris and Windows NT, Third Edition (Mar. 1999) 102 Pages.
White Paper, Foundry Networks, "Server Load Balancing in Today's Web-Enabled Enterprises" Apr. 2002 10 Pages.

(56) References Cited

OTHER PUBLICATIONS

International Search Report & Written Opinion for PCT Application PCT/US2015/012915 mailed Apr. 10, 2015, 15 pages.
Gigamon: Vistapointe Technology Solution Brief; Visualize-Optimize-Monetize-3100-02; Feb. 2014; 2 pages.
Gigamon: Netflow Generation Feature Brief; 3099-04; Oct. 2014; 2 pages.
Gigamon: Unified Visibility Fabric Solution Brief; 3018-03; Jan. 2015; 4 pages.
Gigamon: Active Visibility for Multi-Tiered Security Solutions Overview; 3127-02; Oct. 2014; 5 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Service Provider System Reference Architecture for the Visibility Fabric White Paper; 5004-01; Mar. 2014; 11 pages.
Gigamon: Unified Visibility Fabric—A New Approach to Visibility White Paper; 3072-04; Jan. 2015; 6 pages.
Gigamon: The Visibility Fabric Architecture—A New Approach to Traffic Visibility White Paper; 2012-2013; 8 pages.
Ixia: Creating a Visibility Architecture—A New Perspective on Network Visibilty White Paper; 915-6581-01 Rev. A, Feb. 2014; 14 pages.
Gigamon: Unified Visibility Fabric; https://www.gigamon.com/unfied-visibility-fabric; Apr. 7, 2015; 5 pages.
Gigamon: Application Note Stateful GTP Correlation; 4025-02; Dec. 2013; 9 pages.
Brocade and IBM Real-Time Network Analysis Solution; 2011 Brocade Communications Systems, Inc.; 2 pages.
Ixia Anue GTP Session Controller; Solution Brief; 915-6606-01 Rev. A, Sep. 2013; 2 pages.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Gigamon: Visibility Fabric Architecture Solution Brief; 2012-2013; 2 pages.
Gigamon: Visibility Fabric; More than Tap and Aggregation.bmp; 2014; 1 page.
ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
Gigamon: GigaVUE-HB1 Data Sheet; 4011-07; Oct. 2014; 4 pages.
Brocade IP Network Leadership Technology; Enabling Non-Stop Networking for Stackable Switches with Hitless Failover; 2010; 3 pages.
U.S. Appl. No. 60/998,410 (FDRY-0134-US.PRO), filed Oct. 9, 2007 by Wang et al.
Non-Final Office Action for U.S. Appl. No. 13/584,534 mailed on Oct. 24, 2014, 24 pages.
Restriction Requirement for U.S. Appl. No. 13/584,534 mailed on Jul. 21, 2014, 5 pages.
Non-Final Office Action for U.S. Appl. No. 11/937,285 mailed on Jul. 6, 2009, 28 pages.
Final Office Action for U.S. Appl. No. 11/937,285 mailed on Mar. 3, 2010, 28 pages.
U.S. Appl. No. 60/169,502, filed Dec. 7, 2009 by Yeejang James Lin.
U.S. Appl. No. 60/182,812, filed Feb. 16, 2000 by Skene et al.
U.S. Appl, No. 09/459,815, filed Dec. 13, 1999 by Skene et al.
Notice of Allowance for U.S. Appl. No. 13/584,534 mailed on Dec. 16, 2015, 7 pages.
Delgadillo, "Cisco Distributed Director", White Paper, 1999, at URL:http://www-europe.cisco.warp/public/751/distdir/dd_wp.htm, (19 pages) with Table of Contents for TeleCon (16 pages).
Cisco LocalDirector Version 1.6.3 Release Notes, Oct. 1997, Cisco Systems, Inc. Doc No. 78-3880-05.
"Foundry Networks Announces Application Aware Layer 7 Switching on ServerIron Platform," (Mar. 1999).
Foundry ServerIron Installation and Configuration Guide (May 2000), Table of Contents—Chapter 1-5, http://web.archive.org/web/20000815085849/http://www.foundrynetworks.com/techdocs/SI/index.html.
Foundry ServerIron Installation and Configuration Guide (May 2000), Chapter 6-10, http://web.archive.org/web/20000815085849/http://www.foundrynetworks.com/techdocs/SI/index.html.
Foundry ServerIron Installation and Configuration Guide (May 2000), Chapter 11—Appendix C, http://web.archive.org/web/20000815085849/http://www.foundrynetworks.com/techdocs/SI/index.html.
Gigamon: Adaptive Packet Filtering; Feature Brief; 3098-03 Apr. 2015; 3 pages.
Final Office Action for U.S. Appl. No. 14/030,782 mailed on Jul. 29, 2015, 14 pages.
Final Office Action for U.S. Appl. No. 13/584,534 mailed on Jun. 25, 2015, 21 pages.
U.S. Appl. No. 15/205,889, filed Jul. 8, 2016 by Hegde et al.
U.S. Appl. No. 15/206,008, filed Jul. 8, 2016 by Hegde et al.
U.S. Appl. No. 14/320,138, Notice of Allowance mailed on Sep. 23, 2016, 17 pages.
U.S. Appl. No. 14/848,677, NonFinal Office Action mailed on Feb. 10, 2017, 83 pages.
Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.

\* cited by examiner

| 502 IMSI | | | | |
|---|---|---|---|---|
| 513 SOURCE | 514 DESTINATION | 516 PORT | 518 TUNNEL ID | 520 EGRESS |
| SGSN1 IP | GGSN1 IP | PORT C | TEID CU | 15/1 |
| GGSN1 IP | SGSN1 IP | PORT C | TEID CD | 15/1 |
| SGSN1 IP | GGSN1 IP | PORT U | TEID U1U | 15/1 |
| GGSN1 IP | SGSN1 IP | PORT U | TEID U1D | 15/1 |
| SGSN1 IP | GGSN1 IP | PORT U | TEID U2U | 15/1 |
| GGSN1 IP | SGSN1 IP | PORT U | TEID U2D | 15/1 |

*FIG. 5*

| 902 IMSI |||||
| --- | --- | --- | --- | --- |
| 913 SOURCE | 914 DESTINATION | 916 PORT | 918 TUNNEL ID | 920 EGRESS |
| MME IP | SGW IP | PORT C | TEID CU | 15/1 |
| SGW IP | MME IP | PORT C | TEID CD | 15/1 |
| MME IP | SGW IP | PORT U | TEID U1U | 15/1 |
| SGW IP | MME IP | PORT U | TEID U1D | 15/1 |
| MME IP | SGW IP | PORT U | TEID U2U | 15/1 |
| SGW IP | MME IP | PORT U | TEID U2D | 15/1 |

*FIG. 9*

SESSION-BASED PACKET ROUTING FOR FACILITATING ANALYTICS

CLAIM OF PRIORITY

The present application claims priority under 35 U.S.C. §119(e) to U.S. Provisional Patent Application No. 61/932,650 filed Jan. 28, 2014, titled GTP CORRELATION CLUSTER; U.S. Provisional Patent Application No. 61/994,693 filed May 16, 2014, titled GENERAL PACKET RADIO SERVICE TUNNELING PROTOCOL CORRELATION CLUSTER; and to U.S. Patent Application No. 62/088,434 filed Dec. 5, 2014, titled SESSION-BASED PACKET ROUTING FOR FACILITATING ANALYTICS, the entire contents of which are incorporated herein by reference for all purposes.

BACKGROUND

The disclosure herein pertains generally to the field of telecommunications and more specifically to techniques for routing duplicates of data packets to analytic servers.

General Packet Radio Service (GPRS) is a standard for wireless communications which enables data to be transmitted at speeds up to 115 kilobits per second, compared with Global System for Mobile Communications (GSM) systems' 9.6 kilobits per second. GPRS, which supports a wide range of bandwidths makes efficient use of limited bandwidth and is suitable for sending and receiving small bursts of data, such as e-mail and Web browsing, as well as large volumes of data.

GPRS Tunneling Protocol (GTP) is a group of Internet Protocol (IP)-based communications protocols used to carry packets conforming to the GPRS standard within GSM, UMTS and LTE networks. In Third Generation Partnership Project architectures, GTP and Proxy Mobile IPv6-based interfaces are specified on various interface points. GTP can be decomposed into separate protocols, including GTP-C and GTP-U. In 3G and 4G wireless networks, GTP-C messages are control messages used between the network elements to activate and de-activate sessions originating from mobile user endpoints. As an example, in 3G networks, GTP-C is used within a GPRS core network for signaling between gateway GPRS support nodes (GGSN) and serving GPRS support nodes (SGSN). This allows the SGSN to activate a session on a user's behalf, to deactivate the same session, to adjust quality of service parameters, or to update a session for a subscriber who has just arrived from another SGSN. GTP-U is used for carrying user data within a GPRS core network and between a radio access network and the core network. The user data transported can be packets in any of IPv4, IPv6, or Point-to-Point Protocol (PPP) formats.

An operator of a telecommunication network can find it beneficial to analyze the traffic that flows through that network. Such analysis might be performed for a variety of different reasons. For example, the operator might want to obtain information that could be used as business intelligence. For another example, the operator might want to detect and pre-empt attacks being made through the network. In order to help prevent such attacks, the operator might want to analyze traffic to determine the sources from which different types of traffic originate.

Such traffic analysis can be performed at an analytic server that the operator maintains. Data packets flowing through the network can be duplicated, and the duplicate packets can be diverted to such an analytic server. Due to the vast amount of traffic that flows through the network, the operator might maintain numerous separate analytic servers that are capable of analyzing different portions of the total traffic concurrently.

The traffic flowing through a telecommunications network often will represent multiple separate and distinct communication sessions. Such sessions can originate from different mobile devices. Regarding GPRS, a session is a tunnel that is established between two endpoints in a communication network. Communications between those endpoints passes through this established tunnel. In a 3G network, the session is established through the creation of a packet data protocol (PDP) context—a data structure—on both an SGSN endpoint and a GGSN endpoint. This data structure contains session information, contents of which are described further below. The establishment of the session allocates a PDP context in the SGSN with which the mobile device is currently in communication. The establishment of the session further allocates that PDP context in the GGSN that serving the mobile device user's access point. The data recorded in the PDP context includes: the mobile device's Internet Protocol (IP) address, the mobile device's International Mobile Subscriber Identity (IMSI), a Tunnel Endpoint ID (TEID) at the GGSN, and a Tunnel Endpoint ID (TEID) at the SGSN.

As is mentioned above, traffic analysis can be performed at an analytic server that an operator maintains. In order for the analysis to be complete, it is desirable that all traffic belonging to a particular communication session be diverted to the same analytic server under circumstances in which multiple analytic servers are analyzing the network traffic.

Achieving this result can be difficult due to the fact that the traffic in a mobile telecommunications network can originate from mobile devices that, by their nature, tend to move about geographically. As a mobile device moves from one region to another, the mobile device may leave the range of one cellular telephone tower and come into the range of another cellular telephone tower. The point through which the mobile device accesses the telecommunication network can thus change, as the device moves, from one point (e.g., a first cellular telephone tower) to another point (e.g., a second cellular telephone tower). When such a change occurs, the parameters associated with the mobile device's currently active communication sessions are likely to change as well.

The change in these communication session parameters complicates the task of ensuring that, for each communication session, all of that communication session's traffic will be sent to the same analytic server in a group of such servers. If the parameters associated with a particular communication session change due to the mobile device moving, then network elements that select the analytic server to which duplicate packets should be forwarded might accidentally send subsequent traffic belonging to that particular communication session to a different analytic server than the one to which those network elements had been sending that traffic prior to the change.

SUMMARY

In certain embodiments, a GTP correlation cluster (GCC) can automatically program a network element, such as a switch, to forward copies of packets originating from a mobile device and having a shared attribute to the same port of that network element. The network element thereby sends the packet copies having the shared attribute to the same analytic server, regardless of the regions into which the mobile device moves.

To accomplish this, the GCC can monitor attributes of copies of control packets that the network element receives. For example, the GCC can observe source and destination attributes within control packet copies. In response to detecting a changed source attribute (e.g., SGSN) within a control packet originating from a mobile device, the GCC can update a session map specific to that mobile device in order to cause packets having that changed source attribute to be forwarded to the same port to which packets having the former source attribute were being forwarded prior to the change. As a result, the network element can ensure that packets belonging to a particular session still are forwarded to the same analytic server even if the mobile device has moved to a different region.

When the network element receives a copy of a control packet originating from a mobile device, the network element can forward that control packet copy to the GCC. Information within the control packet copy uniquely identifies the mobile device. The GCC can maintain a separate session map for each separate mobile device.

Using attributes contained in the control packet, the GCC can create a new session map specifically for the mobile device if one does not already exist. The new session map can associate an identifier of a particular port of the network element with a combination of source and destination attributes (e.g., SGSN and GGSN) contained within the control packet. The GCC can choose the particular port by inputting the combination of source and destination attribute values into a specified function.

By determining whether the output of the specified function produces a same port identifier as the one specified within an existing session map for the mobile device, the GCC can determine whether a part of that session map has become invalid. Such invalidity can result from the mobile device moving from one area to another, consequently producing a control packet having the same destination attribute (e.g., GGSN) but a different source attribute (e.g., SGSN).

In response to determining that a part of the session map has become invalid, the GCC can update its session map for the mobile device by changing the source attribute in that part of the session map. Such changing can involve replacing that part of the session map's former source attribute with the control packet's source attribute, while retaining the port that was already specified in that part of the session map. In conjunction with updating the session map, the GCC can program forwarding rules (e.g., an access control list) within the network element. The network element follows these forwarding rules to forward packet copies having this updated attribute combination to the same port to which packet copies having the previous attribute combination were previously forwarded.

BRIEF DESCRIPTION OF THE DRAWINGS

FIG. 5 is a diagram illustrating an example of a populated session map, according to some embodiments.

FIG. 9 is a diagram illustrating another example of a populated session map, according to some embodiments.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Techniques disclosed herein can be used to ensure that a network element, such as a network switch, continues to forward copies of packets originating from a mobile device and having a common attribute (e.g., destination attribute) value to a same port of that network element, thereby to be sent to the same analytic server, regardless of the regions into which the mobile device moves. These techniques can be used to ensure that the network element will not cause copies of packets originating from a mobile device and having a common attribute value to be forwarded to different analytic servers as a result of the mobile device interfacing with different network entry points as the mobile device moves from region to region.

Figure 7:
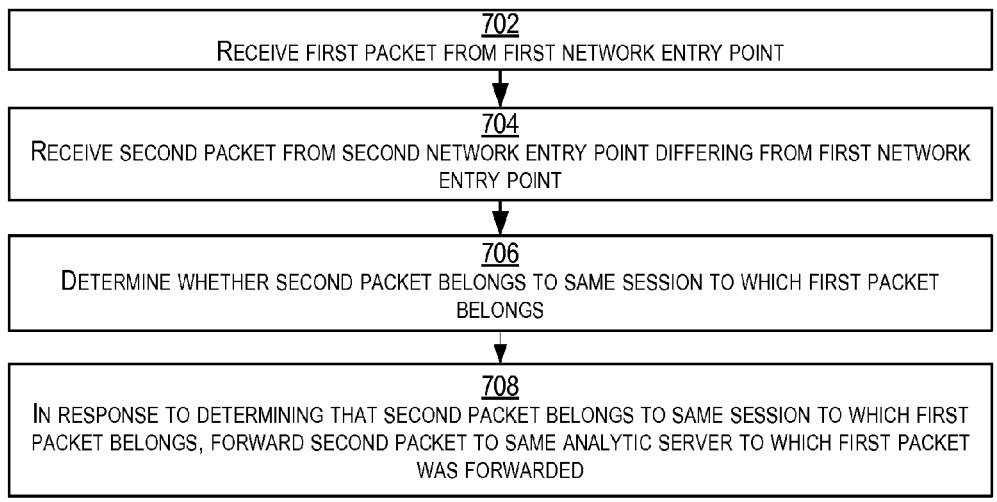
FIG. 7 is a flow diagram illustrating an overview of a technique by which a network node, such as a network switch, can forward packets belonging to a same session to a same analytic server regarding of the diverse network entry points at which those packets entered a telecommunication network, according to some embodiments.

FIG. 7 is a flow diagram illustrating an overview of a technique by which a network node, such as a network switch, can forward packets belonging to a same session to a same analytic server regarding of the diverse network entry points at which those packets entered a telecommunication network, according to some embodiments. Although FIG. 7 illustrates certain operations being performed in a certain order, some embodiments can involve additional, fewer, or different operations being performed in potentially different orders.

In block 702, a network node receives a first packet from a first network entry point. For example, a network switch can receive the first packet via a first cellular telephone tower through which a mobile device was interfacing with a telecommunications network when the mobile device originated the first packet.

In block 704, the network node receives a second packet from a second network entry point. Continuing the example, the network switch can receive the second packet via a second cellular telephone tower through which the mobile device was interfacing with the telecommunications network when the mobile device originated the second packet. The second cellular telephone tower may be in a different location than the first cellular telephone tower. In between the times that the mobile device originated the first and second packets, the mobile device might have moved out of communication range of the first cellular telephone tower and into communication range of the second cellular telephone tower.

In block 706, the network node determines whether the second packet belongs to a same session to which the first packet belongs. Continuing the example, the network switch can make this determination based on a session mapping between an identifier of the mobile device and attributes of the second packet. Techniques for generating this mapping are described in greater detail below.

In block 708, in response to determining that the second packet belongs to the same session to which the first packet belongs, the network node forwards the second packet to an analytic server to which the first packet was forwarded. Continuing the example, based on the session mapping, the network switch can determine that the second packet's attributes are mapped to a same identifier to which the first packet's attributes were formerly mapped, and can consequently conclude that the second packet belongs to the same session to which the first packet belongs. Consequently, the network switch can forward the second packet to a same analytic server to which the network switch previously forwarded the first packet, thereby ensuring that packets from the same session will not be diverted to different analytic servers even if the originating mobile device has accessed the telecommunications network from different network entry points.

Diverting Duplicate GTP Traffic to Analytic Servers

In a telecommunications network, a network switch can receive packets that originated from different mobile devices and flowed through different cellular towers and network entry points. Such packets can belong to different sessions, with each session identified by a combination of attributes (e.g., an IMSI and a destination attribute value). The network switch can forward copies of these packets to various separate analytic servers. The network switch can also forward the original packets on toward their intended destinations. Using values of attributes specified within the packet copies, the network switch can choose the ports of the network switch to which the packet copies are to be forwarded. Some embodiments described herein ensure that copies of packets belonging to a particular session continue to be forwarded to the same port, and therefore analytic server, even if a value of some attribute of the packets (e.g., a source attribute value) changes. In some embodiments described below, a network switch can use a GTP correlation cluster (GCC) in order to achieve this result.

Figure 1:
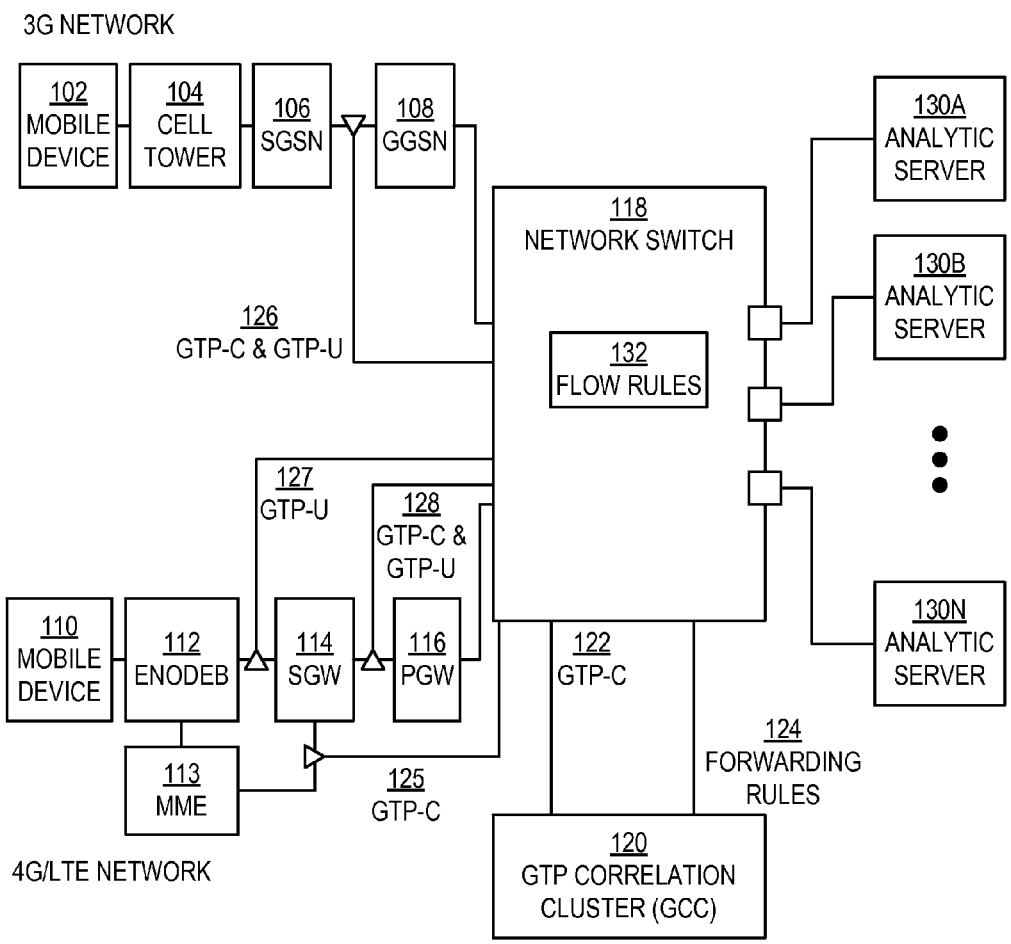
FIG. 1 is a system diagram illustrating an example of a mobile telecommunication network including a GTP correlation cluster (GCC), according to some embodiments.

FIG. 1 is a system diagram illustrating an example of a mobile telecommunication network 100 including a GTP correlation cluster (GCC), according to some embodiments. A GCC can be a device or program that maintains separate session maps for separate mobile devices, that uses information contained in copies of control packets to update the session maps, and that automatically programs data structures in a network element based on the session maps in order to cause the network element to forward copies of packets to analytic servers in a consistent manner. Network 100 includes both a 3G network and a 4G/LTE network. The 3G network includes a mobile device 102, a support GPRS support node (SGSN) 106, and a gateway GPRS support node (GGSN) 108. The 4G/LTE network includes an mobile device 110, an Evolved Node B (eNodeB) 112, a mobile management entity (MME) 113, a serving gateway (SGW) 114, and a packet data network gateway (PGW) 116. Traffic from both networks flows into a network switch switch 118. An example of network switch 118 is the MLXe L2/L3 switch from Brocade Communications Systems, Inc. of San Jose. Network switch 118 interfaces with a GTP correlation cluster (GCC) 120. Network switch 118 also stores a set of flow rules 132.

A tunnel through the network, defined by values within data structures established at network endpoints during a communication session's creation, can be generated for each communication session. Each communication session can be identified by a combination of values of attributes contained within a control packet that is transmitted to establish the communication session (such control packets also can be transmitted when a mobile device begins to interface with a different network entry point (e.g., cell tower)). In some embodiments, each time that a mobile device interfaces with a different cellular tower or other wireless network access point, the mobile device transmits a new control packet identifying a source corresponding to that wireless network access point. The attributes whose values define a session can include, for example, an IMSI and a destination attribute (e.g., GGSN). Packets that travel through a tunnel generated for a session belong to that session.

The communication sessions to which different subsets of traffic entering network switch 118 belong can be identified using GTP correlation cluster (GCC) 120. Based on these identified communication sessions, network switch 118 forwards copies of packets belonging to the subsets through its ports on toward the various ones of analytic servers 130A-N that are performing analysis relative to the traffic associated with those sessions. Network switch 118 forwards the original packets on towards their intended destinations. Each of analytic servers 130A-N can be associated with a different set of communication sessions. Each of analytic servers 130A-N can perform analysis relative to the packet copies belonging for its associated communication sessions. As a result, no communication session is divided among separate ones of analytic servers 130A-N. In one embodiment, there are 48 separate analytic servers 130A-N, each connected to a separate port of network switch 118. Each of analytic servers 130A-N can receive packet copies, classify those packet copies into different types based on rules and packet attribute values, and determine network sources from which different types of traffic originate. In this manner, for example, network traffic that appears to be associated with an attack, such as a denial-of-service attack, can be identified, and the sources of the attack can be ascertained.

In some telecommunications networks (one example being the 3G network depicted in FIG. 1), traffic originating from mobile devices such as mobile device 102 can flow from the mobile device to cell phone tower 104 to SGSN 106 to GGSN 108 to network switch 118. Network switch 118 can forward this original traffic on to its intended destinations. Additionally, a tap can be inserted on the connection between SGSN 106 and GGSN 108. A part of the traffic signal flowing through that connection is thereby duplicated and diverted to network switch 118 for analytic purposes. This duplicate data includes GTP-C (control packets) and GTP-U (data packets) 126. Traffic flowing back from network switch 118 toward the mobile devices passes between GGSN 108 to SGSN 106 in the opposite direction. The tap on the connection therefore additionally duplicates a part of the traffic signal flowing back through that connection and also diverts that traffic signal to network switch 118 for analytic purposes.

The traffic that network switch 118 receives can include packets from multiple different communication sessions. Multiple communication sessions, each involving packets belonging to a particular one of those sessions, can be assigned to a particular one of analytic servers 130A-N. The several communication sessions that may be assigned to a particular analytic server constitute a subset of the total traffic that network switch 118 receives. Each of analytic servers 130A-N can be assigned a different subset of the total traffic, with each subset including multiple communication sessions. Potentially through consultation with GCC 120 (possibly through the application of a hash algorithm), network switch 118 can identify a communication session to which a subset of duplicated traffic, and its constituent packets, belongs. For each duplicated packet, network switch 118 can select, from its ports, the particular port that is associated with the communication session to which that packet belongs. Network switch 118 can then forward the duplicate packet through that selected port to the proper one of analytic servers 130A-N that is handling analytics for that particular communication session.

In some telecommunications networks (one example being the 4G network depicted in FIG. 1), traffic originating from mobile devices can flow from mobile device 110 to eNodeB 112 to serving gateway (SGW) 114 to packet data network gateway (PGW) 116 to network switch 118. Traffic also can flow from eNodeB 112 to MME 113 to SGW 114. Network switch 118 can forward this original traffic on to its intended destinations. Additionally, a duplication mechanism along the path from mobile device 110 to network switch 118 can generate duplicates of the packets flowing along that path. One example of such a duplication mechanism is a tap that can be inserted on the connection between SGW 114 and PGW 116. Packets flowing through that connection are thereby duplicated and diverted to network switch 118 for analytic purposes. These duplicate packets may include GTP-C (control packets) and GTP-U (data packets) data 128. Packets flowing back toward the mobile devices passes between SGW 114 to mobile device 110 in the opposite direction. The duplication mechanism (e.g., a tap on the connection) therefore additionally duplicates packets flowing back through that connection and also diverts those duplicated packets to network switch 118 for analytic purposes. Additionally or alternatively, duplication mechanisms can include taps elsewhere along paths between mobile device 110 and network switch 118. For example, a tap can be inserted on a connection between eNodeB 112 and SGW 114. GTP-U packets 127 flowing through that connection are thereby duplicated and diverted to network switch 118 for analytic purposes. For another example, a tap can be inserted on a connection between MME 113 and SGW 114. GTP-C packets 125 flowing through that connection are thereby duplicated and diverted to network switch 118 for analytic purposes.

Again, through consultation with GCC 120, network switch 118 can identify a communication session to which a duplicate packet belongs. For each duplicate packet, network switch 118 can select, from its ports, the particular port that is associated with that packet's communication session. Network switch 118 can then forward the duplicate packet through that port to the proper one of analytic servers 130A-N that is handling all duplicate data packets for the communication session to which those packets belong.

If a particular mobile device is executing an application that is associated with a particular communication session, then during the course of that particular communication session the mobile device may travel out of range of one cellular telephone tower and into the range of another cellular telephone tower. This change in access point can cause at least some of the parameters (e.g., source) of the particular communication session to change. However, using techniques described herein, in spite of this change, network switch 118 can continue to send, to the same one of analytic servers 130A-N, the duplicated traffic for that communication session both before and after the movement.

Each mobile device is typically associated with a unique International Mobile Subscriber Identity (IMSI) number. When a mobile device establishes a new communication session, the mobile device includes its unique IMSI within the first control packet that the mobile device sends through the telecommunication network. Each communication session can be identified based on a combination of attributes, such as IMSI and destination address, for example. The control packet indicates the source IP address from which subsequent non-control data packets belonging to the same communication session as the control packet will originate. However, although those subsequent non-control data packets typically do indicate the source IP address, they typically do not indicate the IMSI number. Some embodiments may use an International Mobile Station Equipment Identity (IMEI) of a mobile device in conjunction with or in place of the IMSI as described herein.

Due to potential changes in source IP address caused by a mobile device travelling from region to region as discussed above, the non-control data packets belonging to a particular communication session may or may not specify all the same IP addresses that the control packet establishing that session specifies. The data packets might not follow the same path through the network that the control packet follows. While a mobile device is communicating with the mobile telecommunication network through a first cell tower, the data packets from that mobile device may indicate a first source IP address (e.g., for an SGSN) and destination IP address (e.g., for a GGSN) pair, but later, while the same mobile device is communicating with the mobile telecommunication network through a second cell tower during the same session, the data packets now originating from that same mobile device may indicate a second source IP address (e.g., for a different SGSN) and destination IP address (e.g., for the same GGSN) pair different from the first pair. These non-control data packets typically do not specify the IMSI number that was specified by the control packet for the same session.

After a communication session has been established, the data packets belonging to that communication session start to flow through the network. As is discussed above, the movement of a mobile device from one region to another, causing the mobile device to interface with the telecommunication network through a different network entry point, could cause the entry point earlier specified in one of a session's data packets to differ from an entry point later specified in a subsequent data packet belonging to the same session. Network switch 118 is tasked with the responsibility of ensuring that regardless of the entry point of the duplicated data packets belonging to a particular communication session, and regardless of the port of network switch 118 on which those duplicated data packets arrive, all of those duplicated data packets belonging to the particular communication session will be forwarded to the same one of analytic servers 130A-N. Network switch 118 cannot rely upon the duplicate non-control data packets it receives to supply the IMSI number of the non-control packets' origin, because that number is typically not present within those non-control packets; the IMSI number is typically specified within control data packets transmitted during a session's establishment, prior to the transmission of the non-control data packets belonging to that session.

In some embodiments, network switch 118 can ensure that non-control data packets become associated with the proper one of analytic servers 130A-N in spite of possible differences in some of the parameters (e.g., source IP address) specified within those non-control data packets. Network switch 118 can use the services of GCC 120 to determine that a packet is to be forwarded to a specific analytic server regardless of whether some of that packet's parameters differ from parameters of other packets belonging to the same communication session. In certain embodiments, GCC 120 can observe control packets that a mobile device transmits whenever the mobile device begins to interface with a different network entry point (e.g., cell tower). GCC 120 can update a mapping between the IMSI specified in those control packets and the new parameter value(s) contained within those control packets. GCC 120 can use this updated mapping to program network switch 118 to forward non-control packets having those new parameter value(s) to the same analytic server to which non-control packets having the previous parameter value(s) were previously forwarded. GCC 120 can execute on a device separate from network switch 118, or within network switch 118 itself. Through such programming, GCC 120 can update, in network switch 118, forwarding rules 124 (e.g., a GCL) that network switch 118 follows in selecting the ports through which duplicate traffic is to be forwarded to various ones of analytic servers 130A-N. Network switch 118 sends GTP-C (control packet) 122 to GCC 120.

Consistent Routing by Compensating for Mobile Device Movement

The source and destination IP addresses specified in one control packet belonging to a particular communication session might be the same as or different from the source and destination IP addresses specified in a subsequent control packet belonging to the same particular communication session due, for example, to the source IP address changing when a mobile device moves to a different region, as described above. When the address pairs of the control packets match, this is indicative of the situation in which those packets are entering the network through the same cellular telephone tower, and therefore passing through the same SGSN-GGSN pair (in the case of a 3G network) or the same MME-SGW pair (in the case of a 4G/LTE network). Discussed below are systems and techniques for ensuring a network switch will forward copies of non-control packets belonging to a particular communication session to the same analytic server even if address pairs of non-control packets within that particular communication session differ due to mobile device movement. As is described further in greater detail, a network switch can use the services of a GCC in order to ensure this consistent forwarding behavior. A system that includes a GCC is described below in connection with FIG. 2.

Figure 2:
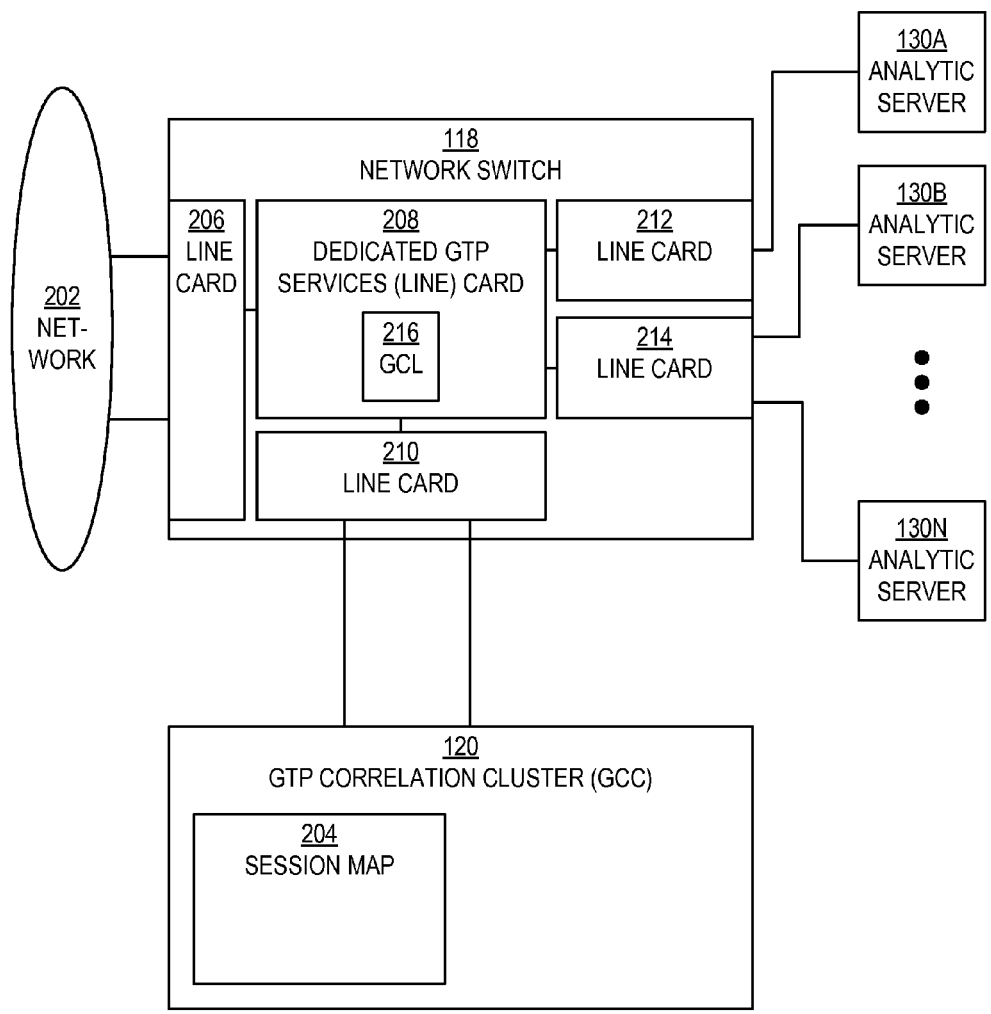
FIG. 2 is a system diagram illustrating an example of a system including a network switch that includes a GTP services card that forwards control packets to a GCC, according to some embodiments.

FIG. 2 is a system diagram illustrating an example of a system 200 including an network switch that includes a GPRS Tunneling Protocol (GTP) services card that forwards mirrored control packets to a GCC, according to some embodiments. Network switch 118, and more specifically a line card (e.g., a 10G line card) 206, can be configured with configuration data that indicates that packets received through a particular ingress port X of switch 118 (and card 206) are to be internally routed to a particular service card (e.g., line card 208) of switch 118. Card 206 can receive packets through a network 202 which can include various sub-networks including the Internet or portions thereof In FIG. 2, the particular service card to which card 206 is configured to forward the designated packets is line card 208 of switch 118. Card 208 can be a configured to act as a dedicated GTP service card instead of sending packets out from or receiving packets into switch 118. Line card 208, in turn, can internally route certain packets to a GCC, as will be discussed in greater detail below.

The configuration stored on card 206 might specify that packets received on any of ingress ports 1-4 are to be internally routed to a particular slot in which card 208 is situated. Under such circumstances, ingress ports 1-4 would be the ports through which network switch 118 is configured to receive duplicated traffic; these ingress ports would be the ports to which the duplication mechanisms (e.g., taps) described above interface, either through network cables or through wireless communications. As a result, duplicated traffic diverted from the duplication mechanism (e.g., taps) is routed within network switch 118 to a dedicated GTP service card—in this example, card 208—specified in the configuration data. The dedicated GTP services card 208 is configured to receive packets from various line cards and to send packets to other line cards within network L2/L3 switch 118.

The dedicated GTP services card—in this example, card 208—can be configured to store data that designates each of the egress ports of network switch 118 that are connected to analytic servers 130A-N. The configuration data can be stored on card 208. These egress ports—also called telemetry ports—can be specified by a slot-and-port combination, for example. For example, assuming that there are 48 analytic servers 130A-N, ports 15/1 through 15/24 (or, ports 1-24 of a line card in slot 15 of network switch 118) and ports 16/1 through 16/24 (or, ports 1-24 of a line card in slot 16 of network switch 118) may be specified, in the configuration of the dedicated GTP services card (which might be in slot 10), as being the egress ports, or telemetry ports, that are connected to analytic servers 130A-N. Although ports are described herein in terms of being "ingress"or "egress" ports, such ports are not necessarily dedicated to only sending or receiving packets; rather, herein, a port is described as being an ingress port when it is to be used for that purpose relative to a data packet, and a port is described as being an egress port when it is to be used for that purpose relative to a data packet. A particular port can alternatively serve as an ingress port or an egress port relative to different packets. In FIG. 2, the line cards that include these egress ports are shown as line card 212 (e.g., in slot 15), and line card 214 (e.g., in slot 16).

Within network switch 118, original packets can be routed internally towards their intended destinations, while duplicate packets (known to be duplicates due to the ports on which they were received) can be routed internally based on whether they are control packets or non-control packets. Duplicate packets (both control and non-control) can be routed internally toward appropriate ones of analytic servers 130A-N, while duplicate control packets (or mirrors of those duplicate control packets) specifically also can be routed internally toward a GCC. The internal routing of a duplicate control packet can proceed from a line card containing the ingress port on which that packet was received, to the dedicated GTP services card, to another line card that forwards the packet to a GCC. In some embodiments, the internal routing of a duplicate control packet may involve other paths within switch 118 to reach a GCC. The discussion that follows pertains specifically to the internal routing of duplicate control packets. By way of an example, the dedicated GTP services card—in this example, card 208—can be configured to store data that instructs that duplicate control packets (i.e., GTP-C packets) received by the dedicated GTP services card are to be internally forwarded to a specified ingress port of a line card in a specified slot of network switch 118. For example, the dedicated GTP service card might be configured to mirror control packets to port 13/1 (or, port 1 of a line card in slot 13 of network switch 118). The line card that receives the duplicate control packets sends the duplicate control packets on to GCC 120. In FIG. 2, this line card is shown as line card 210, (e.g., in slot 13).

Based on the information that it receives over time, GCC 120 can create and maintain a session map 204. The purpose and use of session map 204 is discussed further below. Generally, session map 204 can be used to ensure that data packets belonging to a particular communication session will continue to be directed to the same one of analytic servers 130A-N regardless of the sub-network from which those data packets arrive at network switch 118.

Line card 208, which functions as the dedicated GTP services card, can store a special type of access control list (ACL) called a GTP control list (GCL), shown in FIG. 2 as GCL 216. GCL 216 is an ACL specially customized for GTP traffic. In some embodiments, the forwarding rules discussed above are defined within GCL 216. Packets arriving at line card 208 possess designated attributes which may or may not be currently reflected within any GCL entry. If a particular packet's designated attributes are currently included in a GCL entry, then that particular packet is deemed to be a "hit" relative to GCL 216. Conversely, if the particular packet's designated attributes are not currently included in any GCL entry, then that particular packet is deemed to be a "miss" relative to GCL 216. If a particular packet is a "miss" relative to GCL 216, it means that GCL 216 has not yet been programmed with an entry that indicates the egress port to which packets having the particular packet's designated attribute values are to be forwarded. Such a situation could arise due to the particular packet belonging to a new session, or due to one or more of the values of of the particular packet's designated attributes being different from those of other packets belonging to the same session (e.g., due to the origin mobile device having moved to a different region as discussed above). Over time, GCL 216 can be updated and augmented to include additional entries. GCC 120 can update GCL 216 through programming, by automatically adding or modifying entries within GCL 216. Entries in GCL 216 can map packet attribute values (e.g., values for source and destination IP addresses) to specific egress line cards and specific egress ports of those line cards. A technique by which GCC 120 determines how to modify entries within GCL 216 is discussed in greater detail below.

GTP Correlation Clustering Technique

Figure 3A:
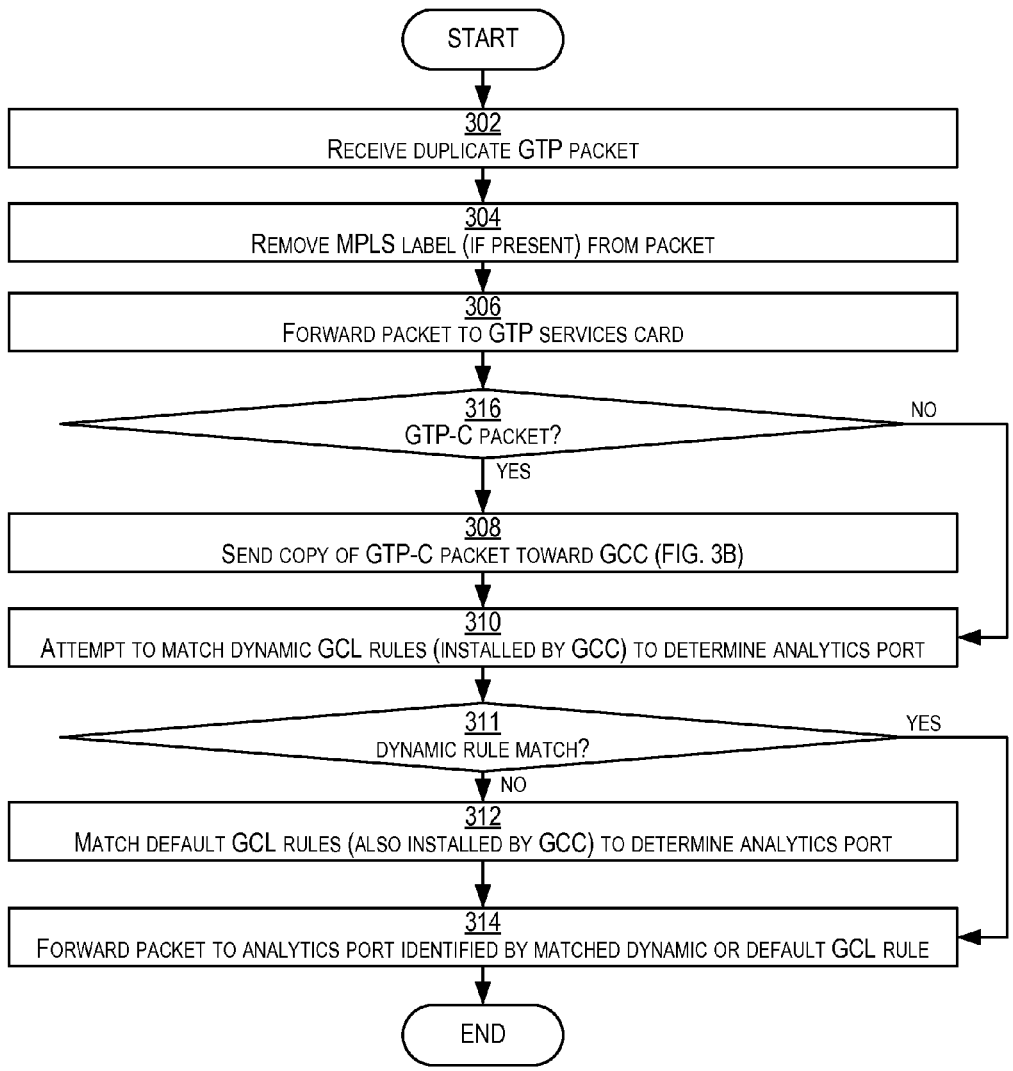
FIG. 3A is a flow diagram illustrating a parts of a technique that a network switch can perform relative to duplicate GTP packets in order to ensure that such packets belonging to a particular communication session will continue to be directed to the same analytic server regardless of the sub-network from which those packets arrive at the network switch, according some embodiments.

As is discussed above, a GCC can automatically add or modify entries within a GCL, which a network switch uses to determine the egress ports to which duplicate non-control packets containing various attribute values are to be forwarded. By automatically programming the GCL in this manner, the GCC ensures that packets belonging to a particular session will continue to be routed toward the same analytic server to which previous packets belonging to that session were routed. The GCC can change GCL entries associated with a particular egress port of the network switch to reflect the new packet attribute value(s) (e.g., source/GGSN IP address) resulting from an originating mobile device's movement to a different region (and into a different sub-network), so that the network switch will route packets having those new attribute values toward that same egress port. FIG. 3A is a flow diagram illustrating parts of a technique that a network switch can perform relative to duplicate GTP packets in order to ensure that such packets belonging to a particular communication session will continue to be directed to the same analytic server regardless of the sub-network from which those packets arrive at the network switch, according to some embodiments. The technique illustrated in FIG. 3A can be performed by network switch 118, for example. Related parts of a technique that network switch 118 can perform relative to duplicate GTP-C (control) packets specifically are discussed further below in connection with FIG. 3B.

In block 302, an ingress line card of the switch can receive a duplicate GTP packet, which might be a GTP-C packet or a GTP-U packet. The packet may be known to be a duplicate due to the packet having arrived on an ingress port on which only duplicate packets can arrive (e.g., a port communicatively coupled to a duplication mechanism such as a tap). Although some embodiments apply specifically to GTP packets and the GTP protocol, techniques described herein can be adapted to packets that conform to protocols other than GTP. For example, line card 206 can receive this packet through network 202. In block 304, the ingress line card can remove a multiprotocol label switching (MPLS) label (if present) from the received packet. For example, line card 206 can strip off this MPLS label. In block 306, the ingress line card can forward the processed packet to a GTP services card. For example, line card 206 can forward the packet, from which the MPLS label has been removed, to line card 208, which is the designated GTP services card.

Figure 3B:
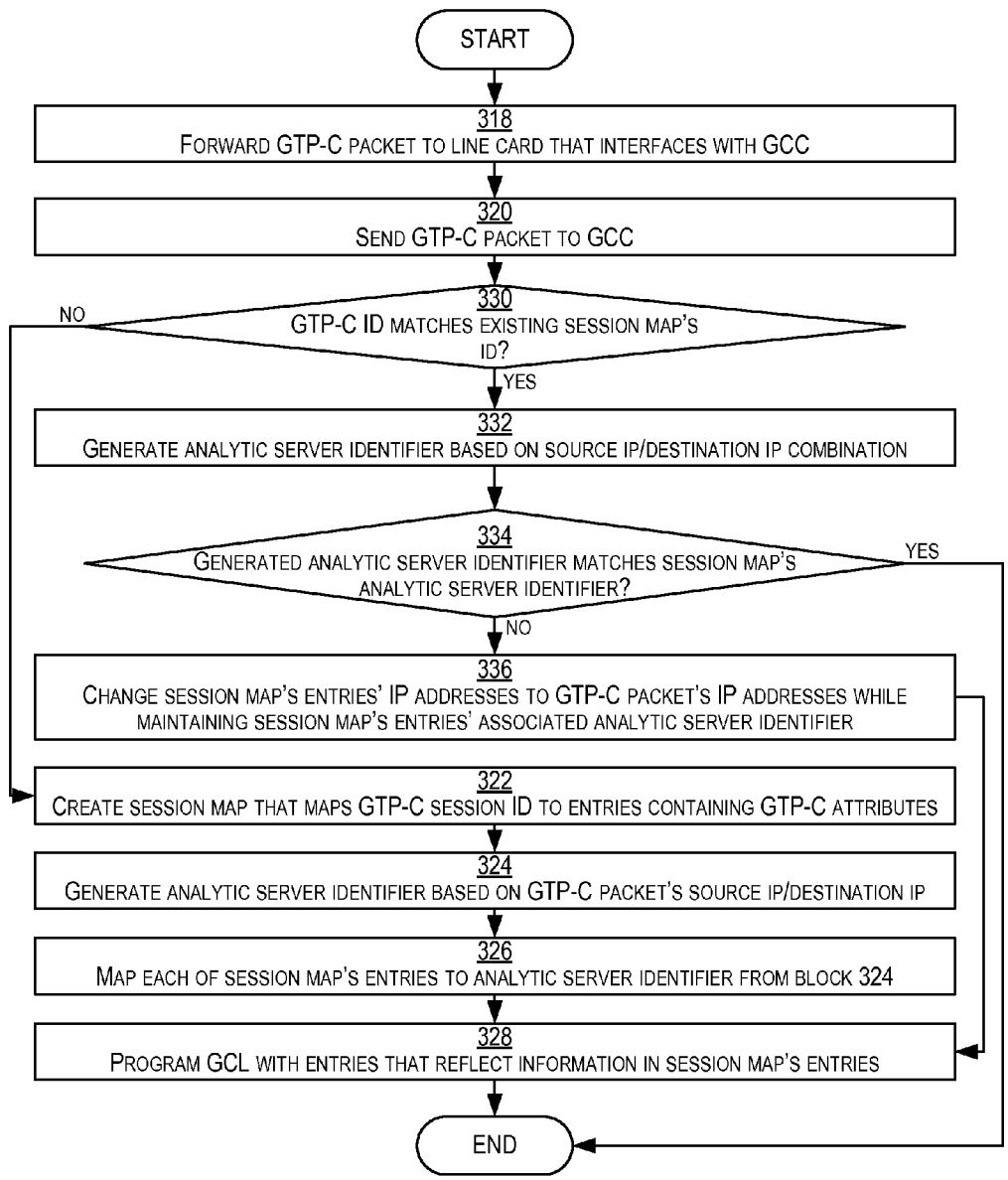
FIG. 3B is a flow diagram illustrating parts of a technique that a network switch can perform specifically relative to duplicate GTP-C packets in order to determine whether a communication session has moved to a different sub-network, and to program a network switch's GCL accordingly to ensure consistent forwarding of the communication session's duplicate packets to a particular analytic server, according to some embodiments.

In block 316, the GTP services card can determine whether the packet is a GTP-C (control) packet. For example, line card 208 can make this determination based on information, such as a transmission control protocol (TCP) port number, contained within the packet. If the packet is a GTP-C packet, then, in block 308, the GTP services card can send a copy of the GTP-C packet toward the GCC. Subsequent operations performed relative to the copy of the GTP-C packet are shown in FIG. 3B. Following the operations of block 308, or if the packet is not a GTP-C packet, control passes to block 310.

In some embodiments, the GCC stores GCL rules that load-balance certain GTP packet attribute ranges (e.g., SGW or SGSN IP address ranges) to specific analytic servers. In some embodiments, the GCC stores dynamic GCL rules to ensure that mobile device movement will not cause a change the analytic server to which GTP packets belonging to a particular session are forwarded. The GCC can program the network switch with both default and dynamic GCL rules.

In block 310, the GTP services card can attempt to match attributes of the packet to dynamic GCL rules, which are installed by the GCC, to determine an analytics port through which the packet is to be forwarded. In block 311, the GTP services card can determine whether the packet's attributes match any of the dynamic GCL rules. If the packet's attributes match a dynamic GCL rule, then control passes to block 314. Otherwise, control passes to block 312.

In block 312, in the event that there is no dynamic GCL rule match, the GTP services card can match default GCL rules, installed by the GCC (like the dynamic GCL rules), to determine an analytics port through which the packet is to be forwarded. The GTP services card can select a particular line card's port that is mapped to or identified by an default GCL rule for forwarding out of the network switch. For example, line card 208 can select a port on line card 212 or 10G line card 214, depending on the determined analytics port. That port can be connected to a corresponding one of analytic servers 130A-N. Duplicate packets having a particular combination of source and destination IP addresses can be directed to the same port and therefore to the same one of analytic servers 103A-N, though packets having different source and destination IP addresses can be directed to different ports of line cards 212-214 and therefore to different ones of analytic servers 103A-N. Control then passes to block 314.

In block 314, the GTP services card can forward the packet to a particular line card's port that is mapped to or identified by a matching dynamic or default GCL rule. For example, line card 208 can forward the particular packet to line card 212 or line card 214, depending on the information contained in the matched rule. That line card can forward the particular packet out through the rule-designated port that is connected to a corresponding one of analytic servers 130A-N. The technique illustrated in FIG. 3A concludes relative to the particular packet, although the technique can be performed again relative to other duplicate GTP packets.

In some cases, an analytic server identifier, associated with one or more analytics ports, can be determined based on a combination of the particular packet's source IP address and destination IP address. The GTP services card can obtain these addresses from the particular packet's outer header. For example, using a specified function, line card 208 can translate these addresses into the analytic server identifier. The specified function may include a hash algorithm, for example. Conceptually, the application of the specified function to the combination of addresses distributes communication sessions among different analytic servers, such that combinations that produce the same analytic server identifier become associated with the same analytic server. This results in duplicate packets having the same addresses being routed to the same analytic server, so that as long as those addresses do not change between packets belonging to the same communication session, all of that communication session's duplicate packets will be routed to the same analytic server. In some embodiments, the combination can include additional or alternative data. In some embodiments, the specified function is designed to produce the same output regardless of whether the source IP address is swapped with the destination IP address in the input. In some embodiments, the analytic server identifier indicates a line card's port (e.g., card and port combination) through which duplicate packets can be forwarded out of the network switch toward the associated analytic server.

FIG. 3B is a flow diagram illustrating parts of a technique that a network switch can perform specifically relative to duplicate GTP-C packets in order to determine whether a communication session has moved to a different sub-network, and to program a network switch's GCL accordingly to ensure consistent forwarding of the communication session's duplicate packets to a particular analytic server, according to some embodiments. Upon determining in block 316 of FIG. 3A that the packet is a GTP-C packet, in block 318 of FIG. 3B, the GTP services card can forward a copy of the particular GTP-C packet to a designated line card that interfaces with the GCC. For example, line card 208 can forward a particular GTP-C packet to line card 210. Inasmuch as some embodiments may involve duplicate GTP-C packets being sent to both an analytic server (for analysis along with all of a communication session's other duplicate packets) and the GCC, some embodiments can involve creating a further copy, or mirror, of each duplicate GTP-C packet specifically for transmission to the GCC. It can be such a mirror of the GTP-C packet the GTP services card transmits to the GCC. In block 320, the designated line card that interfaces with the GCC can send the particular GTP-C packet to the GCC. For example, line card 210 can send the particular GTP-C packet to GCC 120. In some embodiments, this sending can involve forwarding a copy of the particular GTP-C packet out of a port of line card 210. In some embodiments, this sending can involve passing a copy of the particular GTP-C packet to an input data interface of GCC 120. Control passes to block 330.

In block 330, the GCC can determine whether a session map for a mobile device from which the particular GTP-C packet originated exists by determining whether an identifier contained in the particular GTP-C packet matches an identifier of an existing session map maintained by the GCC. For example, assuming that session map 204 already exists, GCC 120 can determine whether an IMSI (which identifies a mobile device) specified in the particular GTP-C packet matches an IMSI specified within session map 204. If a session map for the mobile device exists, as evidenced by an identifier of an existing session map matching the particular GTP packet's identifier (e.g., IMSI), then control passes to block 332. Otherwise, control passes to block 322.

In block 332, the GCC can generate an analytic server identifier that is based on a combination of the particular GTP packet's source IP address and destination IP address. In some embodiments, the GCC generates the analytic server identifier by inputting the combination into a specified function—the same specified function used in block 310 of FIG. 3A. The GCC can obtain these addresses from the particular GTP-C packet's outer header. As is discussed above in connection with block 310 of FIG. 3A, the specified function can include a hash algorithm. In one embodiment, the GCC can input additional or alternative data into the specified function. In some embodiments, the analytic server identifier indicates a line card's port (e.g., card and port combination) through which duplicate packets can be forwarded out of the network switch toward the associated analytic server.

In block 334, the GCC can determine whether the analytic server identifier generated in block 332 is the same as an analytic server identifier (potentially a card-and-port pair through which an analytic server can be reached) that the matching session map associates with its session map entries. In doing so, the GCC determines whether the session map entries in the matching session map contain outdated information. For example, if the analytic server identifier generated in block 332 is not the same as the analytic server identifier in the matching session map's entries, then this implies that some part of the combination input into the function used to generate the analytic server identifier has changed since the session map was constructed (a process for which is described below starting in block 322). The source (e.g., SGSN) IP address specified in the GTP-C packet might differ from the source IP address that was previously detected in a former GTP-C packet at the generation of the session map, for example. The session map entries are discussed in further detail below. GCC 120 can make this determination based on session map entries stored in session map 204, assuming that session map 204 is the matching session map. If the pairs match, then this implies that the mobile device has not moved to a different sub-network, and so the GCC does not need to update the GCL; under such circumstances, the technique illustrated in FIG. 3B concludes relative to the particular GTP-C packet. Alternatively, if the analytic server identifiers from the specified function and the matching session map's entries are not the same, then control passes to block 336. If there was no hit in block 308 of FIG. 3A, then this implies either that the GCC has not yet received any duplicate GTP-C packet from the mobile device, or that the mobile device has moved into a different sub-network, causing the combination of attribute values of the current duplicate GTP-C packet to differ from the combination of attribute values last inserted into the GCL and into the matching session map's entries.

If the analytic server identifiers do not match, due to a combination of attribute values having changed as discussed above, then this indicates that the mobile device has moved out of range of one cellular telephone tower (or other network entry point) and into the range of another cellular telephone tower (or other network entry point). As a result, the combination of source and destination IP addresses (e.g., for an SGSN and GGSN in the case of a 3G network) indicated in the particular GTP-C packet having a particular IMSI differ from the combination indicated in the session map entries of the session map also specifying that particular IMSI.

Typically, in the case of a mismatch, the source IP addresses will differ, while the destination IP addresses will have remained the same. In block 336, the GCC can update the session map entries of the matching session map to reflect the new source and destination IP addresses of the particular GTP-C packet, replacing the existing source and destination IP addresses in those session map entries—though, as discussed above, the destination IP address might remain the same. However, the analytic server identifier (potentially a card-and-port pair) to which those updated session map entries are mapped remains the same, to ensure that packets belonging to the session identified by the particular IMSI continue to be routed internally toward the same one of analytic servers 130A-N as occurred before the mobile device's movement. Control passes to block 328.

Alternatively, in block 322, the GCC can create a new session map based on information contained in the particular GTP-C packet. For example, GCC 120 can create and store session map 204. In one embodiment, the session map maps a session identifier, such as an IMSI, that is specified in the particular GTP-C packet, to designated attributes that are also specified in the particular GTP-C packet. For example, GCC 120 can create session map 204 to map the particular GTP-C packet's IMSI to designated attributes such as a source IP address, a destination IP address, a transmission control protocol (TCP) port, and a tunnel identifier (TEID) specified in the particular GTP-C packet.

In an embodiment, session map 204 associates the GTP-C packet's IMSI with each of four separate session map entries. Two session map entries are for GTP-C packets outbound from a mobile device (GTP-C uplink) and GTP-U packets outbound from the mobile device (GTP-U uplink), respectively. Two session map entries are for GTP-C packets inbound to the mobile device (GTP-C downlink) and GTP-U packets inbound to the mobile device (GTP-U downlink), respectively. Upon receiving an outbound GTP-C packet, the GCC can populate the session map entries for the GTP-C and GTP-U uplinks. Upon receiving an inbound GTP-C packet, the GCC can populate the session map entries for the GTP-C and GTP-U downlinks. Regardless of whether the particular GTP-C packet is inbound or outbound, GCC 120 can determine that the particular GTP-C packet pertains to session map 204 (as opposed to some other session map) due to the particular GTP-C packet specifying the same IMSI (or alternative session identifier) that is stored in session map 204.

With reference to FIG. 1, in the case of a 3G network, the following facts pertain to the session map entries. The GTP-C uplink entry specifies attributes of GTP-C traffic having a source IP address of an SGSN (e.g., SGSN 106) and a destination IP address of a GGSN (e.g., GGSN 108). The GTP-C downlink entry specifies attributes of GTP-C traffic having a source IP address of a GGSN (e.g., GGSN 108) and a destination address of an SGSN (e.g., SGSN 106). Similarly, the GTP-U uplink entry specifies attributes of GTP-U traffic having a source IP address of an SGSN (e.g., SGSN 106) and a destination IP address of a GGSN (e.g., GGSN 108). The GTP-U downlink entry specifies attributes of GTP-U traffic having a source IP address of a GGSN (e.g., GGSN 108) and a destination address of an SGSN (e.g., SGSN 106).

The IP addresses of the SGSN and the GGSN are pertinent in the case of a 3G network because the tap or other duplication mechanism that diverts duplicate traffic to network switch 118 is situated in between the SGSN (e.g., SGSN 106) and the GGSN (e.g., GGSN 108). The actual SGSN and GGSN IP addresses placed in the entries of session map 204 may depend on which of several sub-networks (each having a separate SGSN and GGSN) the traffic flowed through, which may in turn depend on which of several cellular telephone towers (or other network entry points) interfaced wirelessly with the mobile device.

Referring again to FIG. 3, in block 324, the GCC can generate an analytic server identifier based on a combination of the GTP-C packet's attribute values. For example, the GCC can generate the analytic server identifier by inputting a combination of the particular GTP-C packet's source IP address and destination IP address into the specified function—the same specified function used in block 310 of FIG. 3A. The GCC can obtain these addresses from the particular GTP-C packet's outer header. In some embodiments, the GCC can input additional or alternative data into the specified function.

In block 326, the GCC can map each session map entry in the session map to the analytic server identifier (e.g., a card-and-port pair (e.g., 15/1)) produced in block 324 (e.g., by the specified function). This analytic server identifier can identify the line card and the port to which packets having the entry's designated attributes are to be internally directed within the network switch. For example, each session map entry of a particular session map may initially be mapped to card-and-port pair 15/1, indicating that entry-matching packets are to be internally routed to line card 212 (in slot 15), and more specifically, port 1 of that line card.

In block 328, the GCC can program the GCL with GCL entries that reflect the information in the session map entries. For example, for each session map entry in session map 204, GCC 120 can program GCL 216 maintained by line card 208 to include a GCL entry that indicates that packets having a specified source IP addresses, destination IP address, TCP port, and tunnel identifier are to be forwarded to a specified card-and-port pair (e.g., 15/1). The GCL thereby becomes consistent with the session map. Consequently, duplicate packets that are internally routed in response to a GCL hit (per block 314 of FIG. 3A) can be internally routed based on information contained in or derived from the appropriate session map. The technique illustrated in FIG. 3B then concludes relative to the particular GTP-C packet.

Multiple Session Maps for Multiple Communication Sessions

Figure 4:
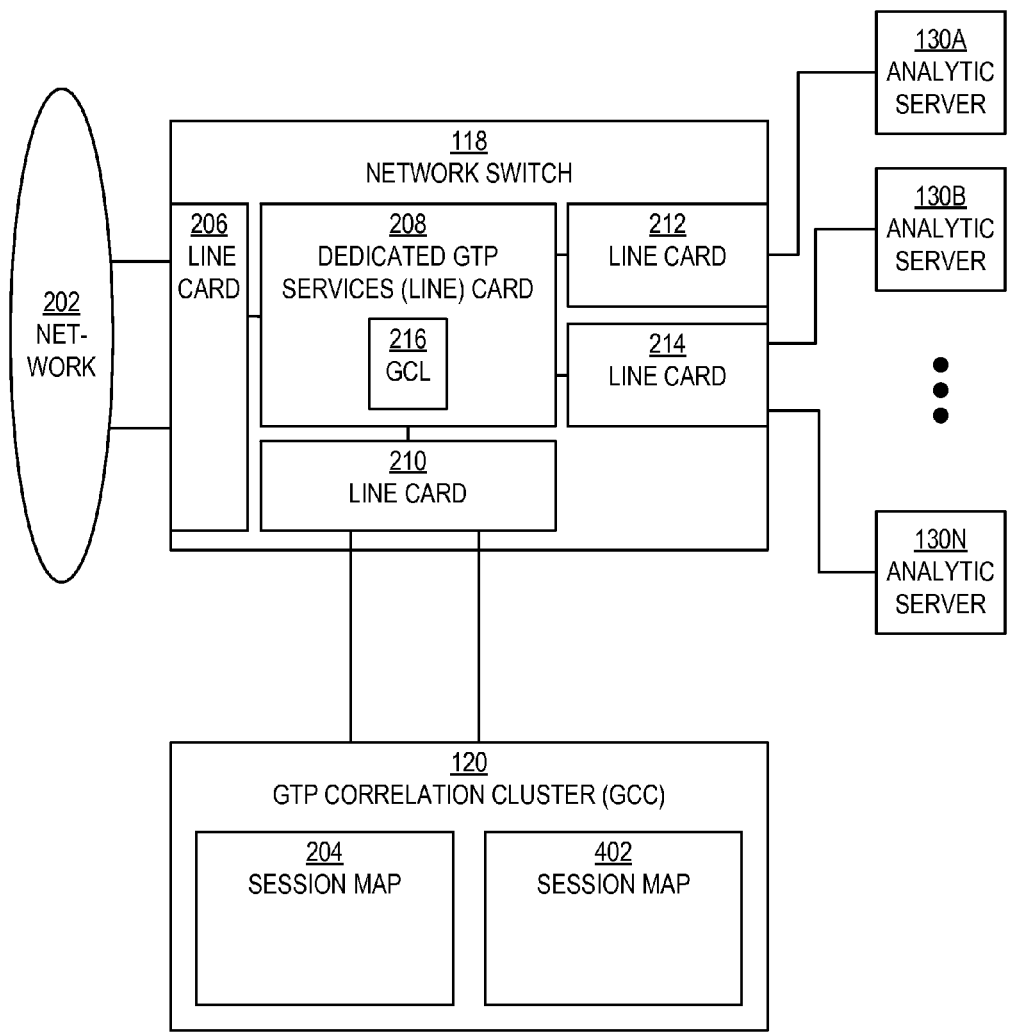
FIG. 4 is a system diagram illustrating an example of a system including a GCC that stores multiple different session maps for multiple different communication sessions, according to some embodiments.

FIG. 4 is a system diagram illustrating an example of a system 400 including a GCC that stores multiple different session maps for multiple different communication sessions, according to some embodiments. System 400 includes components similar to those included in system 200 of FIG. 2. However, in system 400, GCC 120 stores two different session maps: session map 204 (referenced above), and another session map 402. As is discussed above in connection with blocks 322-326 of FIG. 3B, when the GCC receives a GTP-C packet that contains a session identifier (e.g,. an IMSI number) that does not match the session identifier of any existing session map maintained by the GCC, the GCC can responsively create a new session map and stores the GTP-C packet's session identifier in that new session map as that session map's session identifier.

Thus, for example, if GCC 120 receives a first GTP-C packet that specifies a first IMSI, but determines that no existing session map is associated with the first IMSI (perhaps because GCC 120 does not store any session maps initially), then GCC 120 can create a first session map, such as session map 204, and associate the first session map with the first IMSI. GCC 120 can populate session map entries of the first session map with attributes of the first GTP-C packet, such as the first GTP-C packet's source and destination IP addresses. GCC 120 can map the session map entries of the first session map to a card-and-port pair that are identified by the output of a specified function to which GCC 120 supplied at least some of the first GTP-C packet's attributes as input.

Continuing the example, if GCC 120 later receives a second GTP-C packet that specifies a second IMSI that differs from the first IMSI, and therefore again determines that no existing session map is associated with the second IMSI, then GCC 120 can create a second session map, such as session map 402, and associate the second session map with the second IMSI. GCC 120 can populate session map entries of the second session map with attributes of the second GTP-C packet, such as the second GTP-C packet's source and destination IP addresses. GCC 120 can map the session map entries of the second session map to a card-and-port pair that are identified by the output of the specified function to which GCC 120 supplies at least some of the second GTP-C packet's attributes as input.

Continuing the example, if GCC 120 later receives a third GTP-C packet that specifies either the first or second IMSI, then, instead of creating a new session map, GCC 120 can select, from among the existing first and second session maps, a particular session map that is already associated with the third GTP-C packet's IMSI. GCC 120 can determine whether inputting the attributes of the third GTP-C packet into the specified function produces output that identifies the same card-and-port pair with which the session map entries of the particular session map are already associated. If the card-and-port pairs are identical, then the particular session map does not need to be updated.

However, if the card-and-port pairs are not identical, then GCC 120 can take measures to ensure that the third GTP-C packet's attributes will be mapped to the same card-and-port pair that was originally associated with the session map entries of the particular session map. In one embodiment, GCC 120 can accomplish this by updating the particular session map's session map entries to contain the third GTP-C packet's revised attributes, but leave unchanged the original card-and-port pair with which those session map entries are already associated.

After updating any session map in this manner, GCC 120 can program GCL 216 to reflect the updated session map information, so that subsequent GTP-U packets belonging to the same session but containing the third GTP-C packet's attributes (yet no IMSI) will produce a GCL hit that causes those GTP-U packets to be directed to the same one of analytic servers 130A-N as their predecessor GTP-U packets that specified different attributes.

As a result of the foregoing techniques, in some embodiments, as soon as a particular mobile device becomes associated with a particular one of analytic servers 130A-N via the creation of a session map for that mobile device's IMSI, all of the packets duplicated from traffic flowing to or from that mobile device will be directed to that particular analytic server thereafter. This will be the case even if that mobile device's movement causes its traffic to flow through various different SGSN-GGSN pairs or MME-SGW pairs over time. The mobile device gets "stuck" to the same particular analytic server, so that the particular analytic server has the complete picture of all of the mobile device's traffic when performing analysis relative to that traffic.

Example Session Maps

FIG. 5 is a diagram illustrating an example of a populated session map 500, according to some embodiments. Session map 500 includes an IMSI number 502, a GTP-C uplink session map entry 504, a GTP-C downlink session map entry 506, a GTP-U uplink session map entry 508, a GTP-U downlink session map entry 510, a GTP-U uplink session map entry 511, and a GTP-U downlink session map entry 512. Each of session map entries 504-512 includes various attributes, such as source IP address 513, a destination IP address 514, a TCP port 516, and a tunnel identifier 518.

The source IP addresses for uplink session map entries 504 and 506 will typically match the destination IP addresses for downlink session map entries 508 and 510. Conversely, the destination IP addresses for uplink session map entries 504 and 506 will typically match the source IP addresses for downlink session map entries 508 and 510.

In situations where the GTP-C packet arrived at network switch 118 through a 3G network, the uplink source IP addresses and downlink destination IP addresses will typically be an SGSN's IP address, and the the downlink source IP addresses and uplink destination IP addresses will typically be an GGSN's IP address. These will be the IP addresses of the SGSN and GGSN on either end of the tapped connection, if a tap is used as a duplication mechanism.

Each of session map entries 504-510 is mapped to a card-and-port pair 520 that can be determined from the output of a specified function into which attributes (e.g., source and destination IP address combination) of the initial GTP-C packet that caused GCC 120 to create session map 500 were input. As is discussed above, in an embodiment, these card-and-port pairs 520 mapped to session map entries 504-510 remain constant, even if subsequent GTP-C packets bearing the same IMSI number 502 cause any or all of attributes 513-518 to change.

FIG. 9 is a diagram illustrating another example of a populated session map 900, according to some embodiments. Session map 900 includes an IMSI number 902, a GTP-C uplink session map entry 904, a GTP-C downlink session map entry 906, a GTP-U uplink session map entry 908, a GTP-U downlink session map entry 910, a GTP-U uplink session map entry 911, and a GTP-U downlink session map entry 912. Each of session map entries 904-910 includes various attributes, such as source IP address 913, a destination IP address 914, a TCP port 916, and a tunnel identifier 918.

The source IP addresses for uplink session map entries 904 and 906 will typically match the destination IP addresses for downlink session map entries 908 and 910. Conversely, the destination IP addresses for uplink session map entries 904 and 906 will typically match the source IP addresses for downlink session map entries 908 and 910.

In situations where the GTP-C packet arrived at network switch 118 through a 4G/LTE network, the uplink source IP addresses and downlink destination IP addresses will typically be an MME's IP address, and the the downlink source IP addresses and uplink destination IP addresses will typically be an SGW's IP address. These will be the IP addresses of the MME and SGW on either end of the tapped connection, if a tap is used as a duplication mechanism.

Each of session map entries 904-910 is mapped to a card-and-port pair 920 that can be determined from the output of a specified function into which attributes (e.g., source and destination IP address combination) of the initial GTP-C packet that caused GCC 120 to create session map 900 were input. As is discussed above, in an embodiment, these card-and-port pairs 920 mapped to session map entries 904-910 remain constant, even if subsequent GTP-C packets bearing the same IMSI number 902 cause any or all of attributes 913-918 to change.

Network Switch Containing GCC and Analytic Modules

Figure 8:
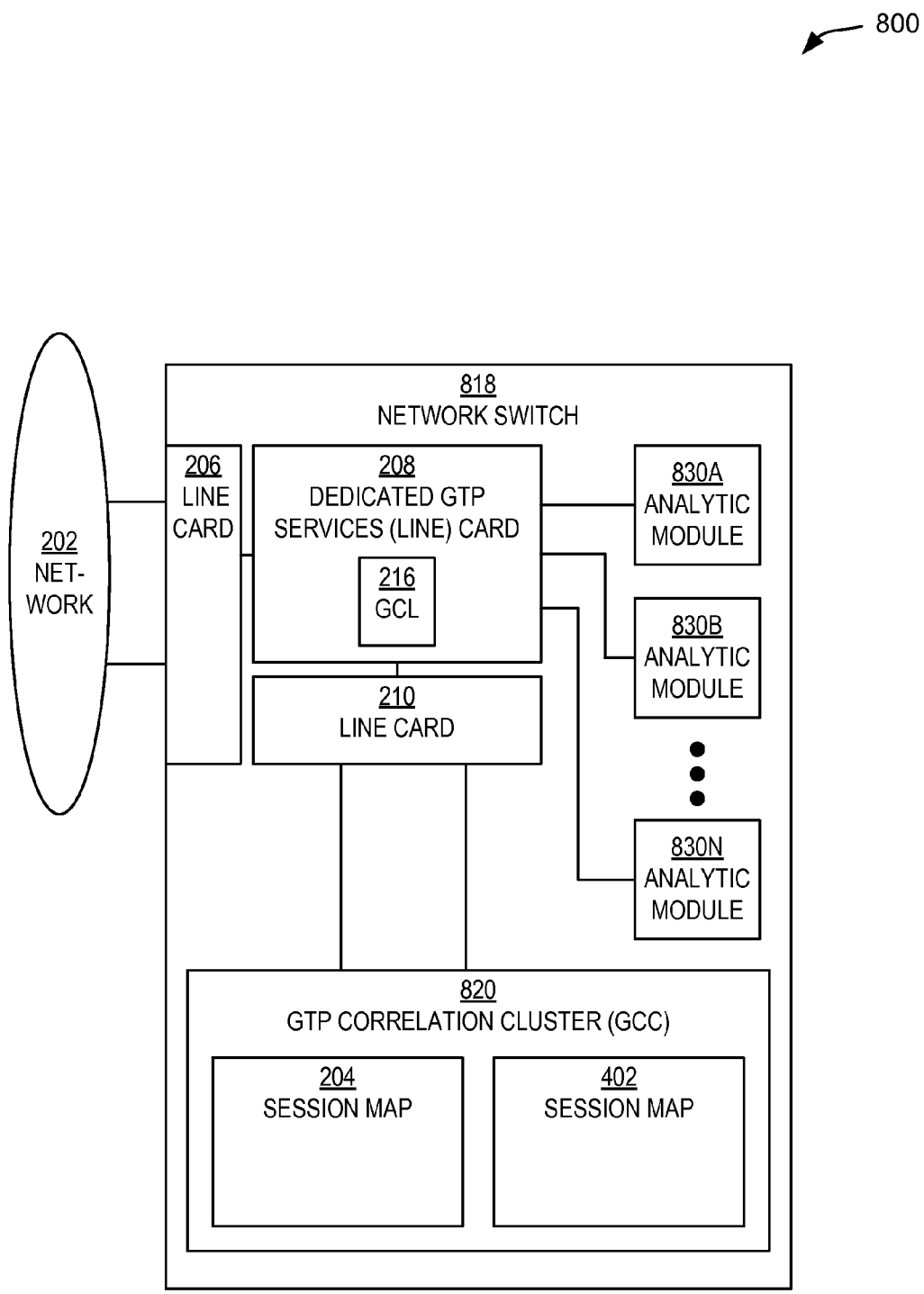
FIG. 8 is a system diagram illustrating an example of a network switch that contains a GCC and analytic modules, according to some embodiments.

FIG. 8 is a system diagram illustrating an example of a network switch that contains a GCC and analytic modules, according to some embodiments. Although some embodiments described above involve a network switch interacting with a GCC and analytic servers that may be external to the network switch, the network switch illustrated in FIG. 8 contains both the GCC and analytic modules that perform the same functions performed by the analytic servers described above.

System 800 includes components similar to those illustrated in system 400 of FIG. 4. However, in system 800, network switch 818 includes GCC 820 and analytic modules 830A-N. Analytic modules 830A-N perform functions described above as being performed by analytic servers. In an embodiment illustrated in FIG. 8, network switch 818 does not need to interface with any external analytic servers.

Analytic modules 830A-N can be processes that execute in parallel within network switch 818. These processes can execute on hardware contained within a line card, which can be modified specifically to store and to execute these processes. Analytic modules 830A-N can store the results of their analytic processing relative to duplicate packets within storage memories contained within such a line card. Additionally or alternatively, analytic modules 830A-830N can execute in parallel on one or more master central processing units or on one or more cores of such central processing units contained within network switch 818. Additionally or alternatively, analytic modules 830A-N can execute within a virtual machine executing within network switch 818 on any of the hardware components described above.

Analytic modules 830A-N can perform traffic analysis relative to data packets flowing through the network. Such packets can be duplicate packets that have been diverted to analytic modules 830A-N. In some embodiments, all traffic belonging to a particular communication session is diverted to the same analytic module under circumstances in which multiple analytic modules are analyzing the network traffic. Each of analytic modules 830A-N can receive packet copies, classify those packet copies into different types based on rules and packet attribute values, and determine network sources from which different types of traffic originate. In this manner, for example, network traffic that appears to be associated with an attack, such as a denial-of-service attack, can be identified, and the sources of the attack can be ascertained.

GCC 820 can automatically program network switch 818 to forward copies of packets originating from a mobile device and having a shared attribute to the same one of analytic modules 830A-N. Network switch 818 thereby sends the packet copies having the shared attribute to the same analytic module, regardless of the regions into which the mobile device moves.

In response to detecting a changed source attribute (e.g., SGSN) within a control packet originating from a mobile device, GCC 820 can update a session map specific to that mobile device in order to cause packets having that changed source attribute to be forwarded to the same one of analytic modules 830A-N to which packets having the former source attribute were being forwarded prior to the change. As a result, network switch 818 can ensure that packets belonging to a particular session still are forwarded to the same analytic module even if the mobile device has moved to a different region.

Instead of calculating an analytic server identifier as described above, a GTP services card (e.g., card 208) can compute an analytic module identifier. Each of analytic modules 830A-N can be associated with a separate and unique analytic module identifier. Such an identifier may, but does not need to, specify a card-and-port pair. In some embodiments, the GTP services card includes multiple ports, each of which interfaces with a separate one of analytic modules 830A-N. In such embodiments, the GTP services card can forward duplicate packets through a port that is associated with the one of analytic modules 830A-N selected using techniques similar to those described above. GCL 216 and session maps 202 and 402 can store and use analytic module identifiers in place of the analytic server identifiers discussed above.

Example Network Node

Figure 6:
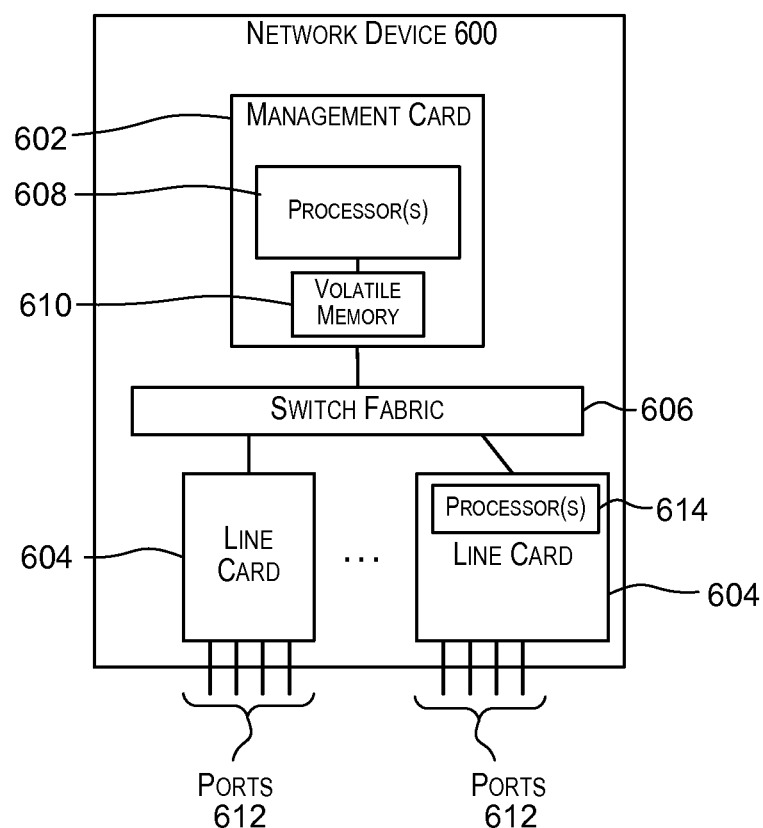
FIG. 6 depicts a simplified block diagram of a network device that may incorporate some embodiments.

Various different systems and devices may incorporate an embodiment of the present invention. FIG. 6 provides an example of a network device that may incorporate an embodiment of the present invention. FIG. 6 depicts a simplified block diagram of a network device 600 that may incorporate an embodiment of the present invention (e.g., network device 600 may correspond to nodes depicted in figures above). In the embodiment depicted in FIG. 6, network device 600 comprises a plurality of ports 612 for receiving and forwarding data packets and multiple cards that are configured to perform processing to facilitate forwarding of the data packets to their intended destinations. The multiple cards may include one or more line cards 604 and a management card 602. In one embodiment, a card, sometimes also referred to as a blade or module, can be inserted into one of a plurality of slots on the chassis of network device 600. This modular design allows for flexible configurations with different combinations of cards in the various slots of the device according to differing network topologies and switching requirements. The components of network device 600 depicted in FIG. 6 are meant for illustrative purposes only and are not intended to limit the scope of the invention in any manner. Alternative embodiments may have more or less components than those shown in FIG. 6.

Ports 612 represent the I/O plane for network device 600. Network device 600 is configured to receive and forward packets using ports 612. A port within ports 612 may be classified as an input port or an output port depending upon whether network device 600 receives or transmits a data packet using the port. A port over which a packet is received by network device 600 is referred to as an input port. A port used for communicating or forwarding a packet from network device 600 is referred to as an output port. A particular port may function both as an input port and an output port. A port may be connected by a link or interface to a neighboring network device or network. Ports 612 may be capable of receiving and/or transmitting different types of traffic at different speeds including 1 Gigabit/sec, 6 Gigabits/sec, 60 Gigabits/sec, or even more. In some embodiments, multiple ports of network device 600 may be logically grouped into one or more trunks.

Upon receiving a data packet via an input port, network device 600 is configured to determine an output port of device 600 to be used for transmitting the data packet from network device 600 to facilitate communication of the packet to its intended destination. Within network device 600, the packet is forwarded from the input port to the determined output port and then transmitted from network device 600 using the output port. In one embodiment, forwarding of packets from an input port to an output port is performed by one or more line cards 604. Line cards 604 represent the data forwarding plane of network device 600. Each line card may comprise one or more packet processors that are programmed to perform forwarding of data packets from an input port to an output port. In one embodiment, processing performed by a line card may comprise extracting information from a received packet, performing lookups using the extracted information to determine an output port for the packet such that the packet can be forwarded to its intended destination, and to forward the packet to the output port. The extracted information may include, for example, the header of the received packet.

Management card 602 is configured to perform management and control functions for network device 600 and represents the management plane for network device 600. In one embodiment, management card 602 is communicatively coupled to line cards 604 via switch fabric 606. Management card 602 may comprise one or more physical processors 608, one or more of which may be multicore processors. These management card processors may be general purpose multicore microprocessors such as ones provided by Intel, AMD, ARM, Freescale Semiconductor, Inc., and the like, that operate under the control of software stored in associated memory 610. The processors may run one or more VMs. Resources allocated to these VMs may be dynamically changed. In some embodiments, multiple management cards may be provided for redundancy and to increase availability.

In some embodiments, one or more line cards 604 may each comprise one or more physical processors 614, some of which may be multicore. These processors may run one or more VMs. Resources allocated to these VMs may be dynamically changed.

The embodiment depicted in FIG. 6 depicts a chassis-based system. This however is not intended to be limiting. Certain embodiments of the present invention may also be embodied in non-chassis based network devices, which are sometimes referred to as "pizza boxes." Such a network device may comprise a single physical multicore CPU or multiple physical multicore CPUs.

Various embodiments described above can be realized using any combination of dedicated components and/or programmable processors and/or other programmable devices. The various embodiments may be implemented only in hardware, or only in software, or using combinations thereof. For example, the software may be in the form of instructions, programs, etc. stored in a computer-readable memory and may be executed by one or more processing units, where the processing unit is a processor, a core of a processor, or a percentage of a core. In certain embodiments, the various processing described above, including the processing depicted in the flowcharts described above can be performed in software without needing changes to existing device hardware (e.g., router hardware), thereby increasing the economic viability of the solution. Since certain inventive embodiments can be implemented entirely in software, it allows for quick rollouts or turnarounds along with lesser capital investment, which further increases the economic viability and attractiveness of the solution.

The various processes described herein can be implemented on the same processor or different processors in any combination, with each processor having one or more cores. Accordingly, where components or modules are described as being adapted to or configured to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A network node configured to perform operations comprising:
    receiving a first packet from a first network entry point;
    receiving a second packet from a second network entry point that differs from the first network entry point;
    determining that the second packet belongs to a same session to which the first packet belongs;
    determining that the second packet contains a second combination of attributes that differs from a first combination of attributes contained in the first packet;
    in response to determining that the second combination of attributes differs from the first combination of attributes, replacing a mapping between the first combination of attributes and an identifier of an analytic server to which the first packet was forwarded with a mapping between the second combination of attributes and the identifier of the analytic server; and after the replacing, forwarding packets that contain the second combination of attributes to the analytic server having the identifier that is mapped to the second combination of attributes.

2. The network node of claim 1, wherein the first and second packets are GTP-C packets.

3. The network node of claim 1, wherein the replacing comprises:
updating a mapping that is associated with an IMSI of a mobile device from which the first packet originated.

4. The network node of claim 1, wherein routing the packets that contain the second combination of attributes comprises routing GTP-U packets that specify the second set of attributes.

5. The network node of claim 1, wherein a set of attributes to which the identifier of the analytic server is mapped includes a source IP address, a destination IP address, a TCP port, and a tunnel identifier.

6. The network node of claim 5, wherein the source IP address is an SGSN IP address, and wherein the destination IP address is a GGSN IP address.

7. The network node of claim 5, wherein the source IP address is an MME IP address, and wherein the destination IP address is a SGW IP address.

8. The network node of claim 1, wherein replacing the mapping between the first combination of attributes and the identifier of the analytic server with the mapping between the second combination of attributes and the identifier of the analytic server comprises:
inputting at least a subset of the second combination of attributes into a specified function; and
determining a card and port pair based on the output of the specified function.

9. The network node of claim 8, wherein routing packets that contain the second combination of attributes to the analytic server having the identifier that is mapped to the second combination of attributes comprises:
determining whether an access control list contains an entry that contains the second combination of attributes; and
responsive to determining that the access control list does not contain any entry that contains the second combination of attributes, determining the card and port pair based on the output of the specified function.

10. The network node of claim 1, further comprising:
responsive to the replacing, altering an access control list to reflect changes produced by the replacing.

11. The network node of claim 1, wherein:
the first network entry point is a first cellular telephone tower with which a mobile device interfaces when the mobile device originates the first packet; and
the second network entry point is a second cellular telephone tower with which the mobile device interfaces when the mobile device originates the second packet.

12. The network node of claim 1, wherein:
the first packet specifies a first source IP address and a particular destination IP address;
the second packet specifies a second source IP address and the particular destination IP address; and
the first source IP address differs from the second source IP address.

13. The network node of claim 1, wherein:
the first packet specifies a first SGSN and a particular GGSN;
the second packet specifies a second SGSN and the particular GGSN; and
the first SGSN differs from the second SGSN.

14. The network node of claim 1, wherein:
the first packet specifies an IMSI; and
the second packet does not specify the IMSI.

15. A method comprising:
receiving, by a network node, a first packet from a first network entry point;
receiving, by the network node, a second packet from a second network entry point that differs from the first network entry point;
determining, by the network node, that the second packet belongs to a same session to which the first packet belongs;
determining, by the network node, that the second packet contains a second combination of attributes that differs from a first combination of attributes contained in the first packet;
in response to determining that the second combination of attributes differs from the first combination of attributes, replacing, by the network node, a mapping between the first combination of attributes and an identifier of an analytic server to which the first packet was forwarded with a mapping between the second combination of attributes and the identifier of the analytic server; and
after the replacing, forwarding, by the network node, packets that contain the second combination of attributes to the analytic server having the identifier that is mapped to the second combination of attributes.

16. A non-transitory computer readable storage medium having stored thereon program code that, when executed by a network node, causes the network node to:
receive a first packet from a first network entry point;
receive a second packet from a second network entry point that differs from the first network entry point;
determine that the second packet belongs to a same session to which the first packet belongs;
determine that the second packet contains a second combination of attributes that differs from a first combination of attributes contained in the first packet;
in response to determining that the second combination of attributes differs from the first combination of attributes, replace a mapping between the first combination of attributes and an identifier of an analytic server to which the first packet was forwarded with a mapping between the second combination of attributes and the identifier of the analytic server; and
after the replacing, forward packets that contain the second combination of attributes to the analytic server having the identifier that is mapped to the second combination of attributes.

* * * * *